United States Patent
Kodama

(10) Patent No.: US 10,798,255 B2
(45) Date of Patent: Oct. 6, 2020

(54) IMAGE DATA GENERATION APPARATUS, INFORMATION PROCESSING SYSTEM, IMAGE DATA GENERATION METHOD, AND RECORDING MEDIUM

(71) Applicant: Taku Kodama, Kanagawa (JP)

(72) Inventor: Taku Kodama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/426,507

(22) Filed: May 30, 2019

(65) Prior Publication Data

US 2020/0045185 A1 Feb. 6, 2020

(30) Foreign Application Priority Data

Jul. 31, 2018 (JP) ................................ 2018-143490

(51) Int. Cl.
| | | |
|---|---|---|
| *H04N 1/409* | (2006.01) | |
| *H04N 1/00* | (2006.01) | |
| *H04N 1/19* | (2006.01) | |

(52) U.S. Cl.
CPC ..... *H04N 1/00005* (2013.01); *H04N 1/00023* (2013.01); *H04N 1/1906* (2013.01); *H04N 1/4092* (2013.01)

(58) Field of Classification Search
CPC ................................................. H04N 1/00005
See application file for complete search history.

(56) References Cited

U.S. PATENT DOCUMENTS

| | | | | |
|---|---|---|---|---|
| 5,266,805 A | * | 11/1993 | Edgar ................. | H04N 1/4097 250/330 |
| 5,917,935 A | * | 6/1999 | Hawthorne .......... | G02F 1/1303 348/126 |
| 7,860,319 B2 | * | 12/2010 | Obrador .............. | G06T 7/0004 348/231.2 |
| 2002/0106133 A1 | * | 8/2002 | Edgar ................. | H04N 1/4097 382/261 |
| 2003/0053713 A1 | * | 3/2003 | Romanik ............. | G06T 7/0004 382/284 |
| 2004/0165762 A1 | * | 8/2004 | Messina .............. | G01N 21/956 382/141 |
| 2005/0068445 A1 | * | 3/2005 | Steinberg ............ | H04N 1/4097 348/335 |
| 2005/0074172 A1 | | 4/2005 | Kodama | |
| 2005/0207659 A1 | | 9/2005 | Kodama | |

(Continued)

FOREIGN PATENT DOCUMENTS

| | | | | |
|---|---|---|---|---|
| JP | 2007-074290 | | | 3/2007 |
| JP | 2007074290 A | * | | 3/2007 |

(Continued)

*Primary Examiner* — Ted W Barnes
(74) *Attorney, Agent, or Firm* — Oblon, McClelland, Maier & Neustadt, L.L.P.

(57) ABSTRACT

An image data generation apparatus includes circuitry configured to refer to image processing association information in which a plurality of image defect types is associated with a plurality of different image processing, respectively; apply, to image data, image processing selected from the plurality of different image processing in accordance with an image defect type included in the image data; and generate processed image data from the image data.

18 Claims, 21 Drawing Sheets

(56) References Cited

U.S. PATENT DOCUMENTS

| | | | |
|---|---|---|---|
| 2005/0248786 A1* | 11/2005 | Tobie | H04N 1/6033 358/1.9 |
| 2005/0286753 A1* | 12/2005 | Ho | H04N 17/04 382/141 |
| 2007/0076962 A1 | 4/2007 | Kodama | |
| 2007/0110163 A1 | 5/2007 | Kodama | |
| 2008/0175468 A1* | 7/2008 | Jau | G06K 9/6228 382/149 |
| 2009/0110310 A1 | 4/2009 | Kodama | |
| 2009/0279795 A1 | 11/2009 | Kodama | |
| 2010/0033679 A1 | 2/2010 | Kodama | |
| 2010/0321712 A1* | 12/2010 | Toda | G06F 3/1284 358/1.9 |
| 2011/0299099 A1* | 12/2011 | Xu | H04N 1/6036 358/1.9 |
| 2012/0237087 A1* | 9/2012 | Wu | H04N 1/52 382/112 |
| 2013/0070277 A1* | 3/2013 | Hoover | H04N 1/00053 358/1.14 |
| 2016/0112581 A1* | 4/2016 | Kishi | H04N 1/6033 358/504 |
| 2016/0140412 A1* | 5/2016 | Kolchin | G06K 9/40 382/260 |
| 2019/0164270 A1* | 5/2019 | Wardell | G06T 7/001 |
| 2019/0272628 A1* | 9/2019 | Tsou | G06T 5/20 |

FOREIGN PATENT DOCUMENTS

| | | | |
|---|---|---|---|
| JP | 2010-041693 | | 2/2010 |
| JP | 2010-067068 | | 3/2010 |
| JP | 2010067068 A | * | 3/2010 |
| JP | 2014-016437 | | 1/2014 |
| JP | 2014016437 A | * | 1/2014 |
| JP | 2015-034807 | | 2/2015 |
| JP | 2015034807 A | * | 2/2015 |

* cited by examiner

FIG. 5

| IMAGE DEFECT TYPE | PRINT PATTERN | | | | | NUMBER OF COPIES | |
|---|---|---|---|---|---|---|---|
| | 80% SOLID | WHITE (BLANK WITH TRIM MARK) | HALFTONE DITHER | SPECIAL PATTERN | | COLOR | MONOCHROME |
| LINES (BLACK LINE) | | ✓ | ✓ (EACH COLOR) | | | 5 | 2 |
| WHITE LINE | | | ✓ (EACH COLOR) | | | 4 | 1 |
| IMAGE PARTLY MISSING (WHITE VOID) | | | ✓ (EACH COLOR) | | | 4 | 1 |
| STAIN (BACKGROUND FOG/ BLACK SPOT) | | ✓ | ✓ (EACH COLOR) | ✓ (OFFSET/ AFTERIMAGE ISOLATION PATTERN) | | 6 | 2 |
| LOW PRINT DENSITY | ✓ (EACH COLOR) | | | | | 4 | 1 |
| COLOR SUPERIMPOSITION MISALIGNMENT | | | | ✓ | | 1 | 1 |

FIG. 6

| IMAGE DEFECT TYPE | IMAGE PROCESSING |
|---|---|
| MAIN SCANNING DIRECTION BLACK LINE | • LOW-PASS FILTER IN MAIN SCANNING DIRECTION<br>• HIGH-PASS FILTER IN SUB-SCANNING DIRECTION |
| MAIN SCANNING DIRECTION WHITE LINE | SAME AS ABOVE |
| SUB-SCANNING DIRECTION BLACK LINE | • LOW-PASS FILTER IN SUB-SCANNING DIRECTION<br>• HIGH-PASS FILTER IN MAIN SCANNING DIRECTION |
| SUB-SCANNING DIRECTION WHITE LINE | SAME AS ABOVE |
| BACKGROUND FOG | INCREASE GRADATION OF HIGH-BRIGHTNESS IMAGE |
| BLACK SPOT | INCREASE GRADATION OF LOW-BRIGHTNESS IMAGE |
| WHITE SPOT | INCREASE GRADATION OF HIGH-BRIGHTNESS IMAGE |

IMAGE DATA GENERATION APPARATUS, INFORMATION PROCESSING SYSTEM, IMAGE DATA GENERATION METHOD, AND RECORDING MEDIUM

CROSS-REFERENCE TO RELATED APPLICATION

This patent application is based on and claims priority pursuant to 35 U.S.C. § 119(a) to Japanese Patent Application No. 2018-143490, filed on Jul. 31, 2018, in the Japan Patent Office, the entire disclosure of which is hereby incorporated by reference herein.

BACKGROUND

Technical Field

The present disclosure relates to an image data generation apparatus, an information processing system, an image data generation method, and a recording medium.

Description of the Related Art

Image forming apparatuses, such as multifunction printers, multifunction peripherals, or multifunction products (collectively "MFPs") may form substandard images having an image defect. For the image defect, there are techniques of reading the substandard image to generate image data of the substandard image and determining a cause of the image defect.

SUMMARY

According to an embodiment of this disclosure, an image data generation apparatus includes circuitry configured to refer to image processing association information in which a plurality of image defect types is associated with a plurality of different image processing, respectively; apply, to image data, image processing selected from the plurality of different image processing in accordance with an image defect type included in the image data; and generate processed image data from the image data.

According to another embodiment, an information processing system includes the image data generation apparatus described above; a server configured to communicate with the image data generation apparatus; and a terminal device that is configured to communicate with the image data generation apparatus and includes a display configured to display the processed image data transmitted from the image data generation apparatus.

According to yet another embodiment, an image data generation method includes referring to image processing association information in which a plurality of image defect types is associated with a plurality of different image processing, respectively; selecting image processing from the plurality of different image processing in accordance with an image defect type included in image data; and perform the selected image processing on the image data to generate processed image data.

According to yet another embodiment, a computer-readable non-transitory recording medium storing a program for causing a computer to execute the method described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 illustrates an example of a test-chart association table according to Embodiment 1;

FIG. 6 illustrates an example of an image-processing association table according to Embodiment 1;

Figure 1:
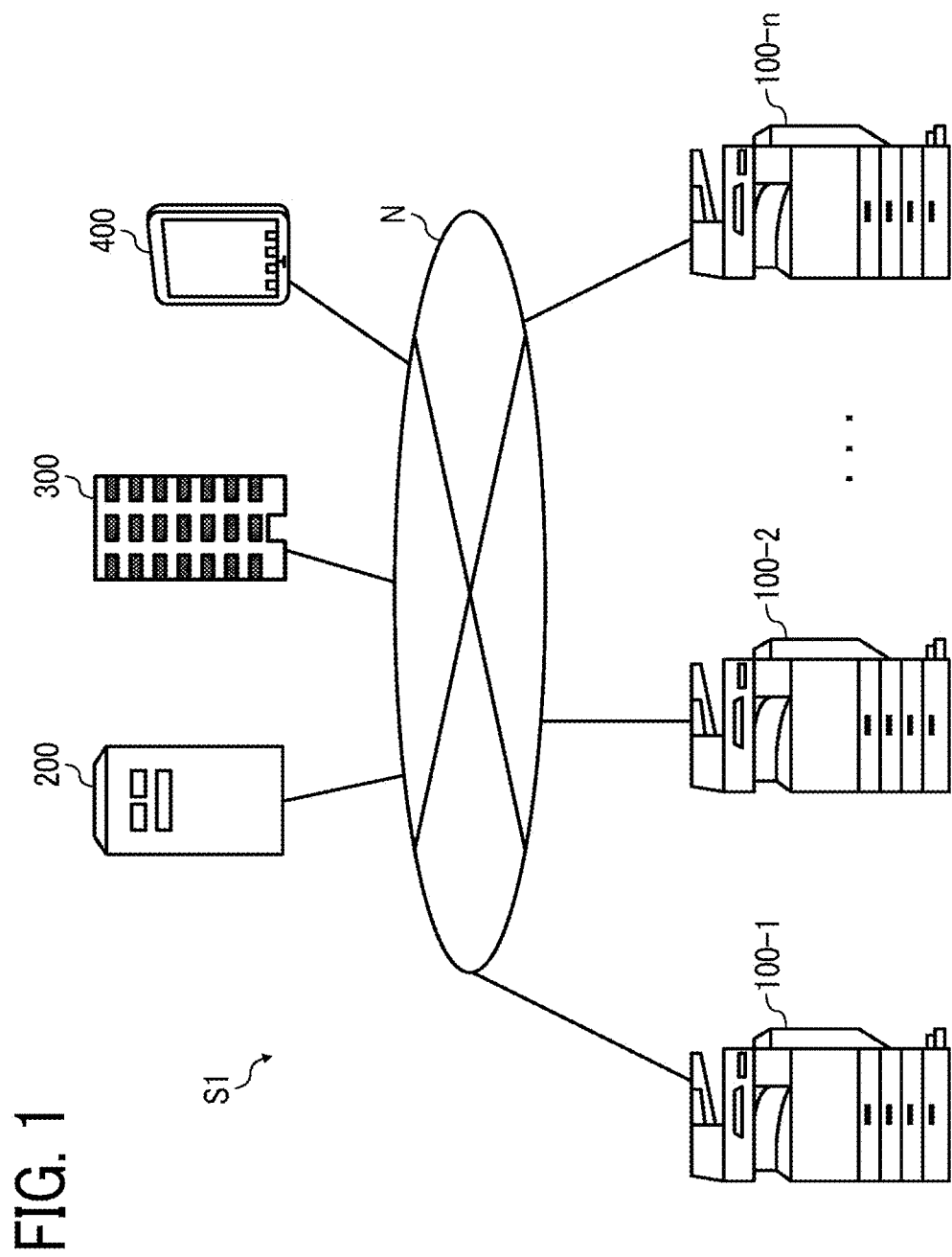
FIG. 1 a schematic view illustrating an example configuration of an information processing system according to Embodiment 1 of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, an information processing system according to embodiments of this disclosure is described. As used herein, the singular forms "a", "an", and "the" are intended to include the plural forms as well, unless the context clearly indicates otherwise.

FIG. 1 illustrates an example configuration of an information processing system according to Embodiment 1. According to the present embodiment, characteristics of image defect can be easily identified.

As illustrated in FIG. 1, an information processing system S1 includes image forming apparatuses 100-1, 100-2, . . . , and 100-n; a server apparatus 200; a call center 300; and a terminal device 400 used by a customer engineer or the like, which communicate with each other via a network N. The subscript "n" is a given integer that represents the number of the image forming apparatuses 100-1, 100-2, . . . , and 100-n. The network N is a communication line including the Internet, a local area network (LAN), a facsimile (FAX) line, a telephone line, and the like. Any one of the image forming apparatuses 100-1, 100-2, . . . , and 100-n is referred to as "image forming apparatus 100".

The image forming apparatus 100, serving as an image data generation apparatus, is, for example, a printer having a printer function and a scanner function. Alternatively, the image forming apparatus 100 can be a so-called multifunction peripheral (MFP) collectively representing a multifunction printer and a multifunction product. That is, the image forming apparatus 100 can be an information processing apparatus having image processing functions (such as facsimile communication, scanning, copying, and printing functions) and a communication function.

The image forming apparatus 100 can have a failure diagnosis program to determine a failure of the image forming apparatus 100 itself based on information on operations executed (performance information). As an example, the failure location and the cause of the failure can be determined based on characteristics of image data generated by reading by a scanner of an image formed on a sheet or the like by the printer function of the image forming apparatus 100. Specifically, in a case where an abnormality is detected in a given color on a sheet, the image forming apparatus 100 can determine the possibility of a failure occurring in a component used in formation of an image of that color. Further, in a case where an abnormality is periodically detected on a sheet, the image forming apparatus 100 can determine the possibility that a component that operates in such a cycle has a malfunction.

The information on operation (hereinafter "performance information") includes identification information of the image forming apparatus 100 that has performed the operation, operation logs, the presence or absence of a predetermined operation, the consumption status of consumables, image data generated by reading of images formed by the image forming apparatus 100, information on failure, and the like. The term "failure" refers to a situation in which there is a malfunction in the operation of the image forming apparatus 100 or the image forming apparatus 100 forms an image (a substandard image) having an image defect. Further, a component of the image forming apparatus 100 that causes the failure may be referred to as a failure location.

Via the network N, the server apparatus 200, serving as the image data generation apparatus, acquires performance information that is information of the operation of the image forming apparatus 100 and a result of failure diagnosis or the like, or accepts performance information or the result of failure diagnosis provided externally.

Based on such information, the server apparatus 200 provides, via the network N, necessary information to the image forming apparatus 100, the call center 300, or the terminal device 400, as necessary.

The call center 300 answers inquiries relating to the image forming apparatuses 100 from respective users of the image forming apparatuses 100 via the network N. Further, the call center 300 accepts, via the network N, the performance information of the image forming apparatuses 100 and results of failure diagnosis transmitted from the users of the image forming apparatuses 100 or the server apparatus 200. Then, based on the accepted information, the call center 300 sends, to the user, a replay instructing a troubleshooting action taken for the image forming apparatus 100 as required. Examples of troubleshooting actions include replacement or replenishment of consumables, replacement of a component, cleaning of a component, and a change in various settings.

In addition, based on the performance information of the image forming apparatus 100 or the result of failure diagnosis transmitted from the user of the image forming apparatus 100 or the server apparatus 200, the call center 300 transmits, to the terminal device 400, a troubleshooting action to be taken for the image forming apparatus 100, as required. The operation of the call center 300 can be performed by a person, or a part or all of the operation thereof can be automated. Alternatively, the server apparatus 200 can execute the automated operation.

The terminal device 400 serving as the image data generation apparatus accepts a request for a troubleshooting action for the image forming apparatus 100 from the call center 300 via the network N. Examples of troubleshooting action include replacement of a component, cleaning of a component, and a change in various settings. Further, the terminal device 400 accepts, from the server apparatus 200 and the call center 300, the performance information of the image forming apparatus 100, the result of failure diagnosis, and the like.

A customer engineer being the user of the terminal device 400 visits the site where the image forming apparatus 100 is installed in accordance with the request for action, accepted by the terminal device 400, and performs a necessary troubleshooting action for the image forming apparatus 100. Further, the customer engineer can use the performance information of the image forming apparatus 100 accepted by the terminal device 400, transmitted from the server apparatus 200 or the call center 300, to perform a necessary troubleshooting action for the image forming apparatus 100.

In the information processing system S1 described above, each of the server apparatus 200, the call center 300, and the terminal device 400 can accept and use, via the network N, the performance information of the image forming apparatus 100 (for example, image data generated by reading a substandard image formed by the image forming apparatus 100) and the result of failure diagnosis performed in the image forming apparatus 100. Further, each of the server apparatus 200, the call center 300, and the terminal device 400 can analyze, with a program thereof, such information, or the user thereof can view such information. As a result, the user of the system can obtain the result of failure diagnosis performed in the image forming apparatus 100 and the like.

As described above with reference to FIG. 1, with use of the information processing system S1, in the case of an occurrence of failure, such as formation of a substandard image, the image forming apparatus 100 or the user of the image forming apparatus 100 can notify the server apparatus 200 or the call center 300 of the occurrence of failure via the network N. Further, the customer engineer performs a troubleshooting action for the image forming apparatus 100 as required.

Figure 2:
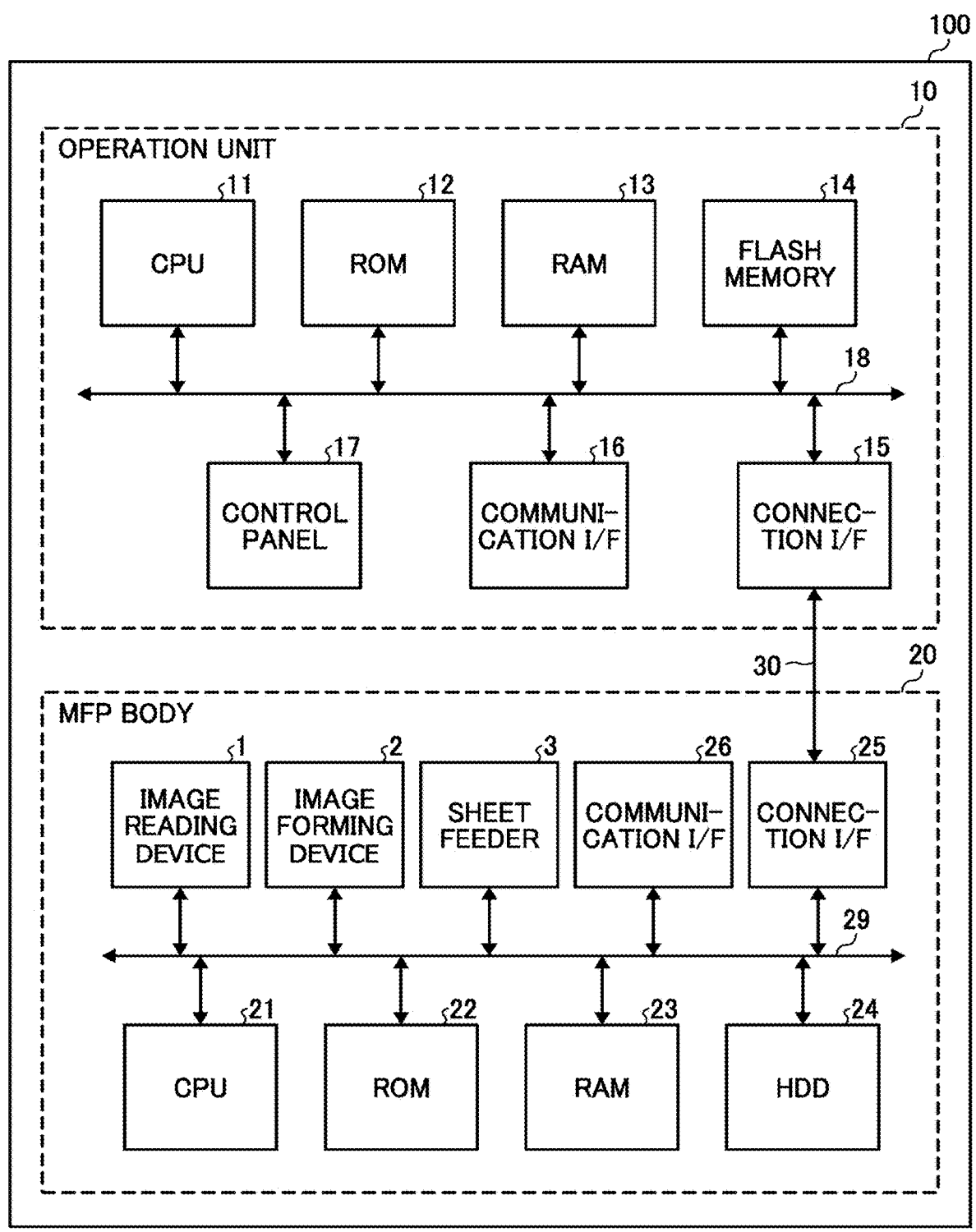
FIG. 2 is a block diagram illustrating a hardware configuration of an image forming apparatus according to Embodiment 1.

FIG. 2 is a block diagram illustrating a hardware configuration of the image forming apparatus according to Embodiment 1. Descriptions are given below of, as an example of the image forming apparatus 100 according to Embodiment 1, an MFP having a plurality of functions such as copying, facsimile (FAX) communication, printing, and scanning functions; and functions to store and distribute an input image (an image of a document scanned or an image input by the printing function or the facsimile function).

The image forming apparatuses 100 includes an operation unit 10 to accept an operation input by the user or the customer engineer and an MFP body 20 to implement various functions such as copying, scanning, facsimile communication, and printing. In this disclosure, the expression "accept(s) an operation" is a concept including accepting information that is input in accordance with the operation. The MFP body 20 and the operation unit 10 communicate with each other via a dedicated communication path 30. An example of the communication path 30 is a communication path in compliance with a universal serial bus (USB) standard. However, any standard, regardless of wired or wireless, can be used as the communication path 30.

The MFP body 20 operates in response to an operation accepted by the operation unit 10. Further, the MFP body 20 is communicable with an external device such as a personal computer (PC) and capable of operating in response to an instruction received from the external device.

Next, a hardware configuration of the operation unit 10 is described. As illustrated in FIG. 2, the operation unit 10 includes a central processing unit (CPU) 11, a read only memory (ROM) 12, a random access memory (RAM) 13, a flash memory 14, a connection interface (I/F) 15, a communication I/F 16, and a control panel 17, which are connected with each other via a system bus 18.

The CPU 11 controls entire operation of the operation unit 10. The CPU 11 executes an operating system (OS) or other application programs stored in the ROM 12 or the flash memory 14, using the RAM 13 as a work area, to control the entire operation of the operation unit 10 and implement various functions, such as displaying information in response to an input from the user.

In addition, the ROM 12 or the flash memory 14 can store a setting widget program, and, for example, a setting widget indicating the current setting of various functions such as the copying function or the printing function can be displayed on a home screen.

The connection I/F 15 is an interface for communicating with the MFP body 20 via the communication path 30. The communication I/F 16 is an interface for connecting to the network N described with reference to FIG. 1.

The control panel 17 as an example of an input device accepts various inputs according to operations of the user or the customer engineer. Further, the control panel 17 displays various types of information. For example, the control panel 17 serves as a display that displays information corresponding to an operation accepted, information indicating an operation status of the image forming apparatus 100, and information indicating current setting of the image forming apparatus 100.

In one example, the control panel 17 as one example of the display is, but not limited to, a liquid crystal display (LCD) having a touch panel function. Another example usable is an organic electro luminescence (EL) display having a touch panel function. As an alternative to or in addition to the LCD or the EL display, the control panel 17 can include a hardware key as an example of the input device and an indicator lamp as an example of the display. The control panel 17 can be a portable information terminal that can be used even when the control panel 17 is separate from the image forming apparatus 100.

A hardware configuration of the MFP body 20 is described below. As illustrated in FIG. 2, the MFP body 20 includes a CPU 21, a ROM 22, a RAM 23, a hard disc drive (HDD) 24, a connection I/F 25, a communication I/F 26, an image reading device 1, an image forming device 2, and a sheet feeder 3, which are connected with each other via a system bus 29.

The CPU 21 controls entire operation of the MFP body 20. The CPU 21 executes an OS or other application programs stored in the ROM 22 or the HDD 24, using the RAM 23 as a work area, to control the entire operation of the MFP body 20. Thus, the CPU 21 implements various functions such as copying, scanning, facsimile communication, and printing functions described above. The ROM 22 or the HDD 24 further stores at least a part of the failure diagnosis program for diagnosing a failure, described later. Each time each of these functions is executed, information about the execution can be stored, in the HDD 24 or the like, as an operation log of the image forming apparatus 100.

The connection I/F 25 is an interface for enabling the MFP body 20 to communicate with the operation unit 10 via the communication path 30. The communication I/F 26 is an interface for the MFP body 20 to connect to the network N.

The image reading device 1, the image forming device 2, and the sheet feeder 3 are hardware that performs processing, such as copying, scanning, and printing, except for general information processing and communication processing.

Figure 3:
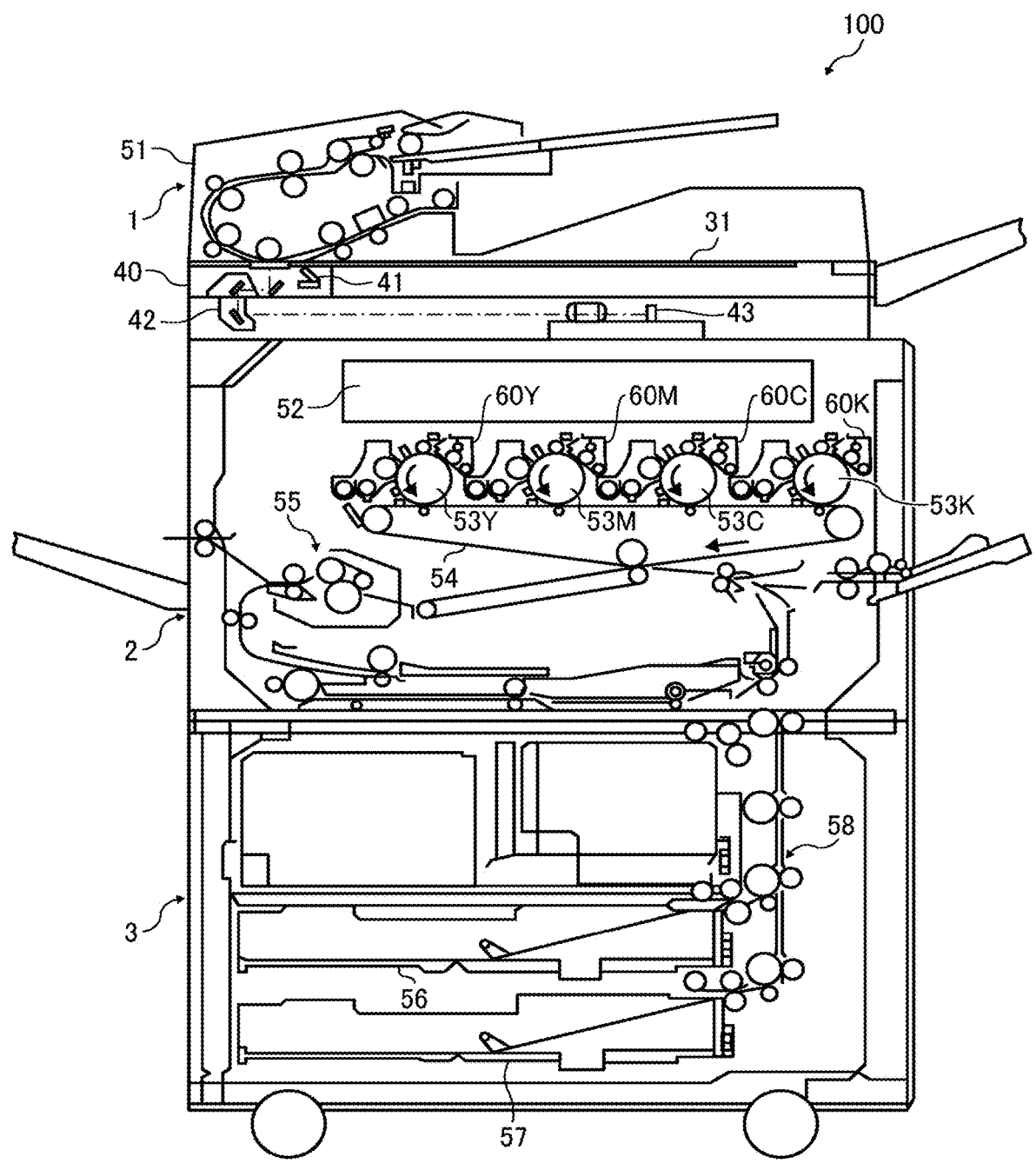
FIG. 3 is a cross-sectional view of the image forming apparatus according to Embodiment 1.

As an example, the image reading device 1 functions as a scanner that optically reads an image on a recording medium such as a sheet of paper and generates image data. As an example, the image forming device 2 forms (that is, prints) an image on a recording medium such as paper by an electrophotographic method, an inkjet method, or another printing method. For example, the sheet feeder 3 feeds a recording medium, such as a sheet, on which the image forming device 2 is to form an image to the image forming device 2. Referring to FIG. 3, hardware configurations of the image reading device 1, the image forming device 2, and the sheet feeder 3 are described.

The MFP body 20 can further include a facsimile unit to perform facsimile communication, a finisher to perform sorting of recording media, or both, as hardware that performs processing, such as copying, scanning, and printing, except for general information processing and communication processing.

Further, the MFP body 20 can include a media I/F for reading data from and writing data to various types of media.

FIG. 3 is a detailed view illustrating the hardware configuration of the image forming apparatus 100. FIG. 3 is a perspective view of the image forming apparatus 100 as viewed from a side. With reference to FIG. 3, descriptions are mainly given below of components relating to the image reading device 1, the image forming device 2, and the sheet feeder 3 described with reference to FIG. 2, of the components of the image forming apparatus 100.

The term "component of the image forming apparatus 100" represents, not only a single component, but also an assembly constructed of a plurality of components to implement a certain function. Also, an assembly including a plurality of assemblies is also called a component.

As illustrated in FIG. 3, the image forming apparatus 100 includes the image reading device 1, the image forming device 2, and the sheet feeder 3.

The image reading device 1 includes an exposure glass 31 as a reading table and an optical reading device 40. The optical reading device 40 includes a light source 41, a mirror 42, and an optical sensor 43. Light from the light source 41 is directed onto a recording medium such as a paper sheet placed on the exposure glass 31. The light reflected on the recording medium is further reflected by the mirror 42 toward the optical sensor 43. Based on the data thus obtained, the optical reading device 40 generates image data. The image reading device 1 can further include a document feeder 51. The document feeder 51 automatically conveys the recording medium with a sheet feeding roller and generates image data with a reading device in the document feeder 51.

The image forming device 2 includes an exposure unit 52 and image forming units 60Y, 60M, 60C, and 60K (hereinafter simply "image forming units 60" when color discrimination is not necessary). The image forming units 60 include photoconductor drums 53Y, 53M, 53C, and 53K (hereinafter simply "photoconductor drums 53" when color discrimination is not necessary).

The exposure unit 52 exposes the photoconductor drum 53 to form a latent image, based on image data generated by scanning of an image by the image reading device 1 or a printing instruction received from an external device. As described below, the image forming units 60 supply different color toners to latent images formed on the photoconductor drums 53 respectively for development.

The developed images on the photoconductor drums 53 are then transferred via a transfer belt 54 onto the recording medium fed by the sheet feeder 3, after which a fixing unit 55 fuses the toner of the toner images and fixes the color image on the recording medium.

The sheet feeder 3 includes sheet feeding trays 56 and 57 to accommodate different size recording media and a feeder unit 58 to feed the recording medium from the sheet feeding tray 56 or 57 to an image formation position in the image forming device 2. The feeder unit 58 includes various types of rollers.

The image formation technique used by the image forming apparatus 100 can be electrophotographic or inkjet printing, and is not particularly limited.

Figure 4:
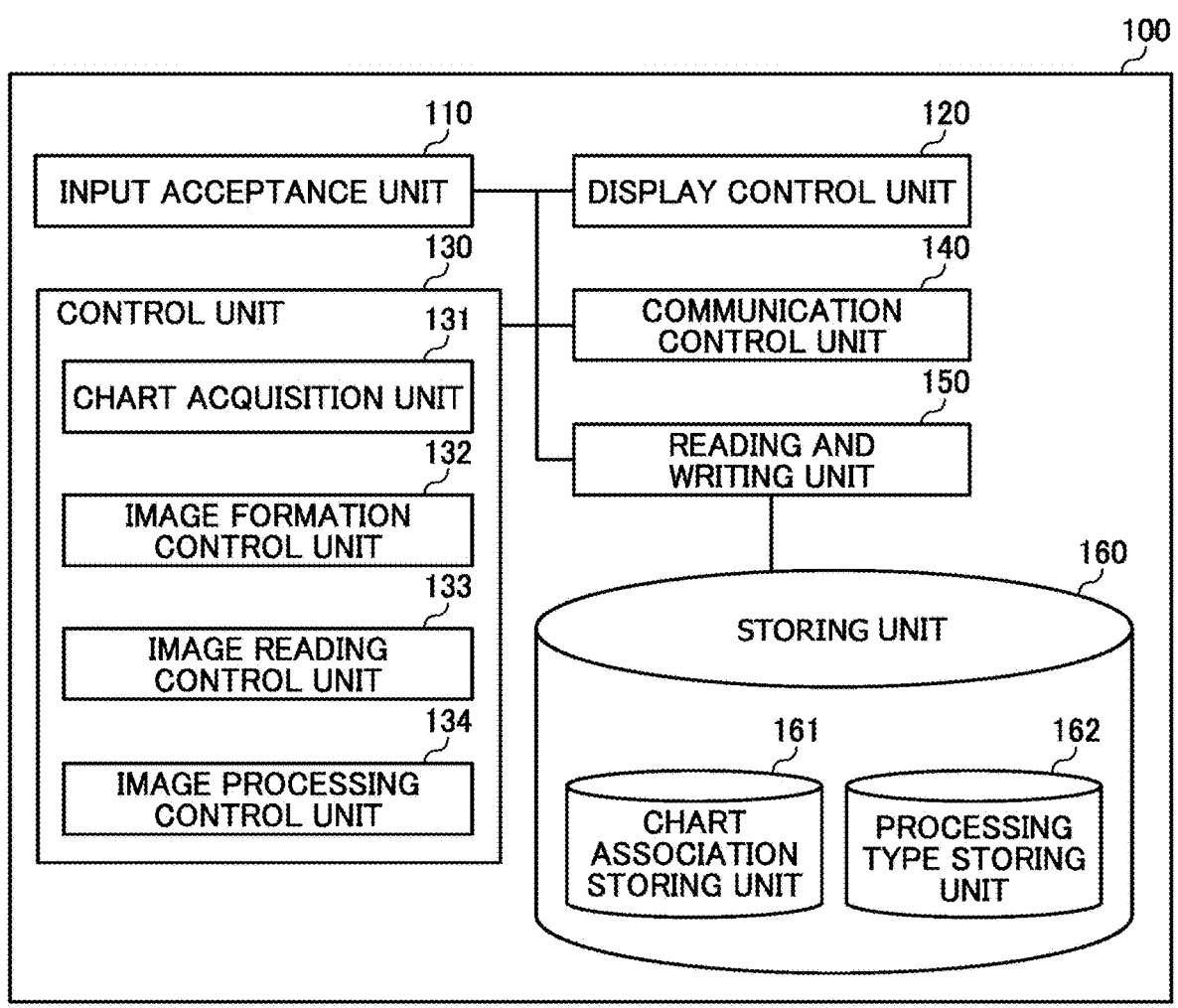
FIG. 4 is a block diagram illustrating a functional configuration of the image forming apparatus according to Embodiment 1.

FIG. 4 is a functional block diagram of the image forming apparatus 100. The image forming apparatus 100 includes an input acceptance unit 110, a display control unit 120, a control unit 130, a communication control unit 140, a reading and writing unit 150, and a storing unit 160.

The input acceptance unit 110 is implemented by processing of the operation unit 10 or the communication interface 26 to receive various inputs made by the operator of the image forming apparatus 100 or communication signals from external devices.

The display control unit 120 is implemented by the CPU 11 executing a program stored in the ROM 12 or the flash memory 14, using the RAM 13 as a work area. The display control unit controls a display screen to be displayed on the control panel 17. The display control unit 120 may also be implemented by the CPU 21 executing a program stored in the HDD 24, using the RAM 23 as a work area.

The control unit 130 is implemented by the CPU 21 executing a program stored in the ROM 22 or the HDD 24 using the RAM 23 as a work area, and executes copying, scanning, printing, or a facsimile function, as one example of the function of the entire image forming apparatus 100. Further, depending on the control content, the control unit 130 may be implemented by the CPU 11 executing a program stored in the ROM 12 or the flash memory 14, using the RAM 13 as a work area.

The control unit 130 includes a chart acquisition unit 131, an image formation control unit 132, an image reading control unit 133, and an image processing control unit 134. Details of the control unit 130 will be described later in a processing flow.

The communication control unit 140 is implemented by the processing of the communication interface (I/F) 16 or the communication I/F 26. To transmit via email the image data to the outside or accept various types of setting information from an external device, the communication control unit 140 communicates with the external device via a network.

The reading and writing unit 150 is implemented by the CPU 21 executing a program stored in the ROM 22 or the HDD 24 using the RAM 23 as a work area. The reading and writing unit 150 stores various types of data in the storing unit 160 and retrieves the data stored therein.

The reading and writing unit 150 is also implemented by the CPU 11 executing a program stored in the ROM 12 or the flash memory 14 using the RAM 13 as a work area. The reading and writing unit 150 stores various types of data in the storing unit 160 and retrieves the data stored therein.

The storing unit 160 is implemented by processing of the ROM 22 or the HDD 24 to store programs, document data, various setting information necessary for the operation of the image forming apparatus 100, operation logs of the image forming apparatus 100, and the like. Alternatively, the storing unit 160 can be implemented by a temporary storage function of the RAM 23.

The storing unit 160 is also implemented by processing of the ROM 12 or the flash memory 14 to store programs, document data, various setting information necessary for the operation of the image forming apparatus 100, operation logs of the image forming apparatus 100, and the like. Alternatively, the storing unit 160 can be implemented by a temporary storage function of the RAM 13.

The storing unit 160 includes a chart association storing unit 161 and a processing type storing unit 162.

The chart association storing unit 161 preliminarily stores image defect association information in which a plurality of image defect types (line stains, misalignment in color superimposition, etc.) are associated with test charts (image patterns), for example, in the form of a table (i.e., a test-chart association table).

Here, the test chart will be described. To prevent or alleviate image defects, the image processing system S1 acquires data representing various features of image defects, such as location where the image defect has occurred and the degree and nature of the image defect. Hereinafter, data representing such image defect characteristics may be referred to as a feature value. The feature value differs depending on the type of image defect, and a print pattern suitable for acquiring the feature value differs accordingly. That is, one of print patterns is selected, as the test chart, in accordance with the type of image defect, to acquire an effective feature value for eliminating or alleviating the image defect.

Therefore, the chart association storing unit 161 described above stores image defect types and the test charts respectively suitable for acquiring the feature values from the image defect types associated with each other, in advance. A detailed description thereof will be given later.

The processing type storing unit 162 stores, in advance, associations between the type of an image defect included in the image data (such as line stains, misalignment in color superimposition, etc.) and image processing to be applied to the image data, for example, in a table format (e.g., an image-processing association table). A detailed description thereof will be given later.

FIG. 5 is an example of the test-chart association table. In FIG. 5, the first column from the left presents five types of image defects: lines (black lines), white lines, image party missing (white void), stains (background fog or black spots), low print density, and color superimposition misalignment. The print pattern marked with a circle in the line of the image defect is associated as the test chart for that image defect.

For example, with the image defect type "lines (black lines)", two print patterns of "white (blank with trim mark)" and "halftone dither" are associated as test charts. In the halftone dither column, "each color" is noted with a circle. This means that, with the image defect type, the respective color halftone dither patterns that can be output by the image forming apparatus 100 are associated.

In the column of lines (black lines), "5" is specified in the column "color" as the number of test charts to be printed, and "2" is specified in the column "monochrome" as the number of test charts to be printed. These numbers are the number of test charts printed in total in a case of multicolor machine ("color machine") model and a case of monochrome machine model. In other words, if the type of image defect is "lines (black lines)", a color machine prints one white (blank with trim mark) test chart and four halftone dither test charts, namely, yellow, magenta, cyan, and black halftone dither test charts. Thus, five sheets in total are printed. By contrast, a monochrome machine prints two sheets in total: one white (blank with trim mark) test chart and one black halftone dither test chart. In the test-chart association table illustrated in FIG. 5, the number of test chart sheets to be printed are specified in the "number of copies" column separately for color and monochrome.

FIG. 6 illustrates an example of the image-processing association table (image-processing association information). As illustrated in FIG. 6, the type of image defect is associated with image processing. The left column of the image-processing association table presents, as the types of image defect included in image data, seven image defect types: "main scanning direction black line" representing a black line (or lines) extending in the main scanning direction, "main scanning direction white line" representing a white line (or lines) extending in the main scanning direction, "sub-scanning direction black line" representing a black line (or lines) extending in the sub-scanning direction, "sub-scanning direction white line" representing a white line (or lines) extending in the sub-scanning direction, "background fog", "black spot", and "white spot".

In the image-processing association table, as illustrated in FIG. 6, each of the image defect types is associated with one or more image processing. That is, in a case of image defect type "main scanning direction black line" or "main scanning direction white line", image processing to highlight edges of lines extending in the main scanning direction are executed. Specifically, low-pass filter in the main scanning direction of an image and high-pass filter in the sub-scanning direction of the image are executed. By contrast, in a case of image defect type "sub-scanning direction black line" or "sub-scanning direction white line", image processing to highlight edges of lines extending in the sub-scanning direction are executed. Specifically, low-pass filtering in the sub-scanning direction of an image and high-pass filtering in the main scanning direction of the image are executed. To perform such processing to highlight edges (edge enhancement) in a desired direction as described above, the coefficient of the spatial filtering applied to the data of the read image can be set as appropriate.

Further, when the image defect is "background fog", in order to make the dirt portion distinctive, gradation of high-brightness image is increased as the image processing. Further, when the image defect is "white spot" meaning that the image is partly missing creating white spots, white spots are hard to find in a faint (bright) image portion. Accordingly, image processing for increasing gradation of a high-brightness image is performed to make the bright image portion noticeable. On the other hand, when the image defect is "black spot" meaning black dot-like stains, black spots are hard to find in a dark (low-brightness) image portion. Accordingly, image processing for increasing gradation of a low-brightness image is performed to make the low-brightness image portion noticeable.

The right column of the image-processing association table includes six types of image processing: "high-pass filter in main scanning direction", "low-pass filter in main scanning direction", "high-pass filter in sub-scanning direction", "low-pass filter in sub-scanning direction", "increase gradation of high-brightness image", and "increase gradation of low-brightness image".

In these image processing, "high-pass filter in main scanning direction", "low-pass filter in main scanning direction", "high-pass filter in sub-scanning direction", and "low-pass filter in sub-scanning direction" involve filtering as an image processing content. Further, the image processing "increase gradation of high-brightness image" and "increase gradation of low-brightness image" involve processing to increase the gradation as an image processing content.

The image processing "high-pass filter in main scanning direction" and "low-pass filter in main scanning direction" involve processing performed in the main scanning direction. The image processing "high-pass filter in sub-scanning direction" and "low-pass filter in sub-scanning direction" involve processing performed in the sub scanning direction.

The image processing "high-pass filter in main scanning direction" and "high-pass filter in sub-scanning direction" involves processing targeted at a high-pass area. The image processing "low-pass filter in main scanning direction" and "low-pass filter in sub-scanning direction" involves processing targeted at a low-pass area. The image processing "increase gradation of high-brightness image" involves processing targeted at a high-brightness image area. The image processing "increase gradation of low-brightness image" involves processing targeted at a low-brightness image area.

As described above, the image processing types can be categorized depending on the content of the image processing, the direction of image processing, and the targeted image area. For example, the image processing "increase gradation of high-brightness image" and "increase gradation of low-brightness image" can be defined as image processing types performed for different types of image areas. Meanwhile, the content of the image processing, that is, increasing gradation, is common to these image processing types.

Alternatively, for association with the image processing type, the image defect type, the location where the image defect occurs, the color of the defective image portion, the size of the defective image portion, and the like can be combined.

Figure 7:
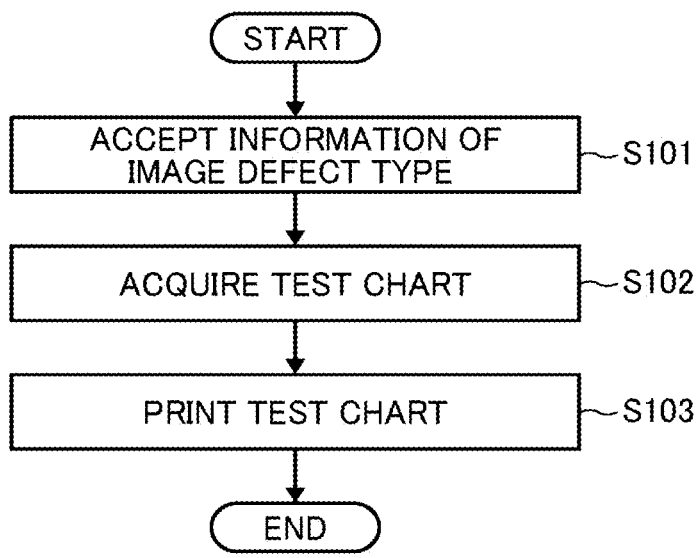
FIG. 7 is a flowchart illustrating an example of test chart printing process according to Embodiment 1.

FIG. 7 is a flowchart illustrating an example of test chart printing process according to Embodiment 1. The flow starts as the input acceptance unit 110 of the image forming apparatus 100 accepts information of image defect type that the user wants to improve. The image processing system S1 can be configured to provide, on a display of the control panel 17, a guide for the operator to input the information of image defect type, as described later.

First, the input acceptance unit 110 accepts the information of type of image defect of an input image (S101). In response to an acceptance of the information of image defect type, the chart acquisition unit 131 refers to the test-chart association table stored in the chart association storing unit 161 via the reading and writing unit 150 and acquires a test chart corresponding to the input image defect type (S102). The chart acquisition unit 131 transmits the acquired test chart to the image formation control unit 132. Then, the image formation control unit 132 prints the acquired test chart (S103).

Figure 8:
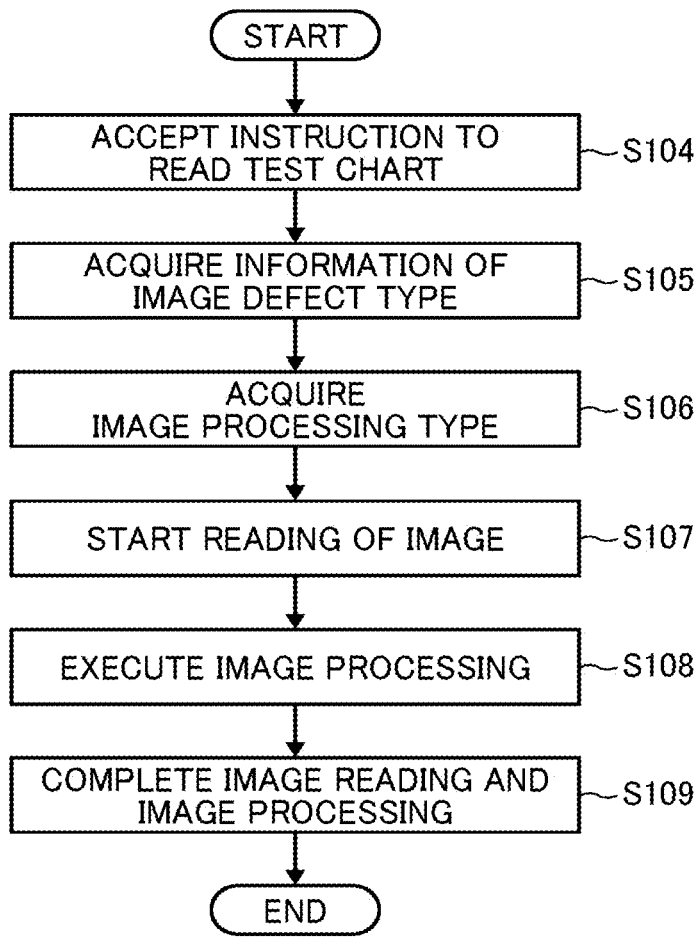
FIG. 8 is a flowchart illustrating an example of test chart reading process according to Embodiment 1.

FIG. 8 is a flowchart illustrating an example of test chart reading process according to Embodiment 1. The flow illustrated in FIG. 8 starts in response to an input of an instruction to read the test chart from the control panel 17 of the image forming apparatuses 100 after the test chart is printed in S103 illustrated in FIG. 7.

First, the input acceptance unit 110 accepts an instruction to read the test chart (S104). Then, the image processing control unit 134 acquires the information of image defect type of the input image (S105).

The image processing control unit 134 refers to the image-processing association table illustrated in FIG. 6 and acquires the image processing type, using the image defect type as a key, based on the accepted information of image defect type (S106). Then, the image reading control unit 133 starts image reading (S107). According to the image processing type acquired in S106, the image processing control unit 134 performs the image processing of the read image data generated by the reading in S107 (S108). When the image reading and the image processing are completed (S109), the process ends. As the process ends, processed image data (post-processed image data) is generated.

Thus, the processed image data in which the characteristics of the image defect are more recognizable than the read image data is generated. Accordingly, based on the processed image data, the failure that has caused the image defect can be properly determined.

Embodiment 2 is described below. The features illustrated in FIGS. 1 to 7 are common to Embodiments 1 and 2, and redundant descriptions are omitted.

Figure 9:
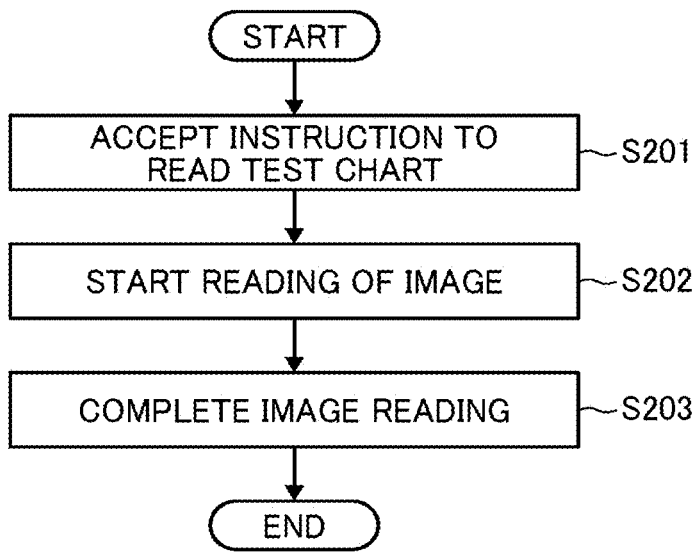
FIG. 9 is a flowchart illustrating an example of test chart reading process according to Embodiment 2.

FIG. 9 is a flowchart illustrating an example of test chart reading process according to Embodiment 2. The flow illustrated in FIG. 9 starts in response to an input of an instruction to read the test chart printed in S103, transmitted from the control panel 17 of the image forming apparatuses 100 (an example of the image data generation apparatus) after the test chart is printed as illustrated in FIG. 7.

First, the input acceptance unit 110 accepts an instruction to read the test chart (S201). Then, the image reading control unit 133 starts image reading (S202). When the image reading is completed (S203), the process ends. As the process ends, read image data is generated.

Figure 10:
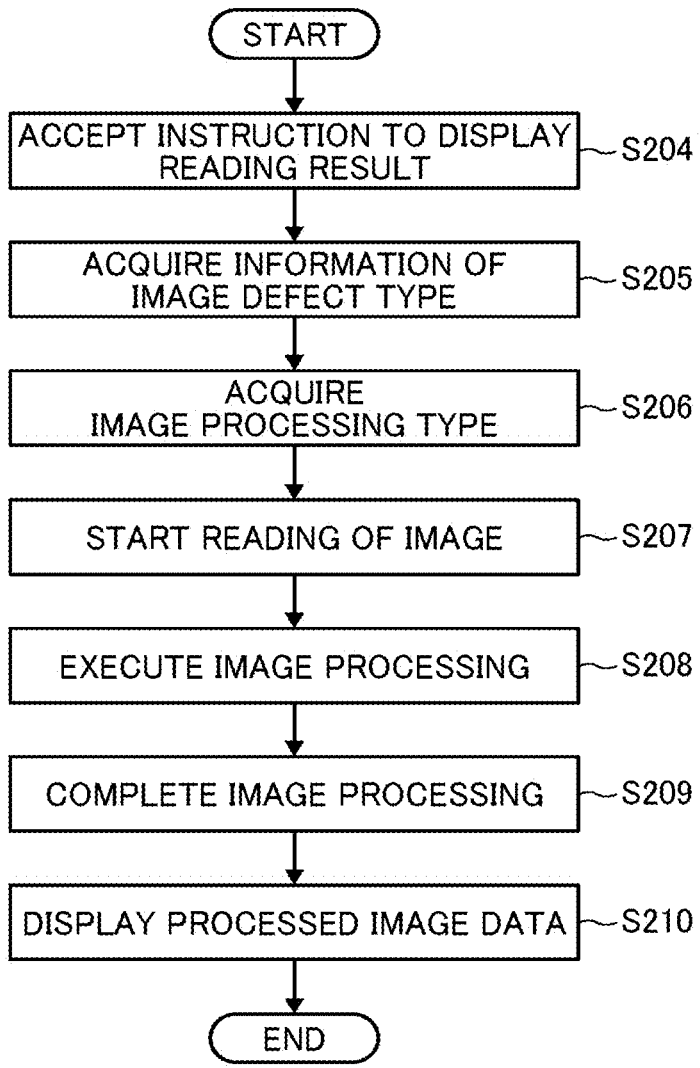
FIG. 10 is a flowchart illustrating an example of test chart display process according to Embodiment 2.

FIG. 10 is a flowchart illustrating an example of test chart display process according to Embodiment 2. The flow illustrated in FIG. 10 starts in response to an input of an instruction to display the result of reading of the test chart from the input acceptance unit 110 after the flow illustrated in FIG. 9 ends.

First, the input acceptance unit 110 accepts an instruction to display the result of reading (S204). The image processing control unit 134 refers to the image-processing association table illustrated in FIG. 6 and acquires the image defect type, based on the accepted information of image defect type (S205).

The image processing control unit 134 refers to the image-processing association table illustrated in FIG. 6 and acquires the type of image processing, using the image defect type as a key, based on the accepted information of image defect type (S206). Then, the image reading control unit 133 starts image reading (S207). According to the image processing type acquired in S206, the image processing control unit 134 performs the image processing of the read image data generated by the reading in S207 (S208). After the image processing is completed (S209), the display control unit 120 displays the generated processed image data (S210), and the process ends. As the process ends, the read image data and the processed image data (processed image data) are displayed.

Thus, the processed image data in which the characteristics of the image defect are more recognizable than the read image data is generated. Accordingly, based on the processed image data, the failure that has caused the image defect can be properly determined.

Embodiment 3 is described below. The features illustrated in FIGS. 1 to 7 and FIG. 9 are common to Embodiments 1 and 3, and redundant descriptions are omitted.

Figure 11:
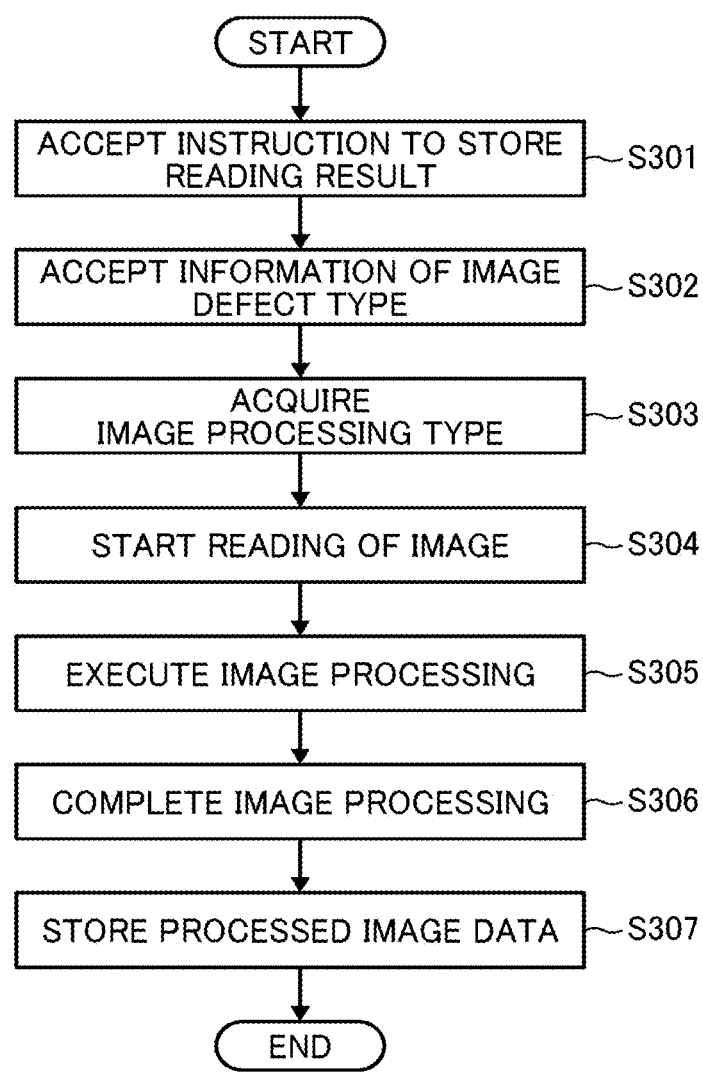
FIG. 11 is a flowchart illustrating an example of a flow of process to store a result of reading according to Embodiment 3.

FIG. 11 is a flowchart illustrating an example of a flow of process to store the result of reading according to Embodiment 3. The flow illustrated in FIG. 11 starts in response to an input of an instruction to store the result of reading of the test chart from the input acceptance unit 110 after completion of image reading as illustrated in FIG. 9. The term "store(s)" used here means storing of data to a non-volatile storage medium, for example.

First, the input acceptance unit 110 accepts an instruction to store the result of reading (S301). The image processing control unit 134 refers to the image-processing association table illustrated in FIG. 6 and acquires the image defect type, based on the accepted information of image defect type (S302).

The image processing control unit 134 refers to the image-processing association table illustrated in FIG. 6 and acquires the image processing type, using the image defect type as a key, based on the accepted information of image defect type (S303). Then, the image reading control unit 133 starts image reading (S304). According to the image processing type acquired in S106, the image processing control unit 134 performs the image processing of the read image data generated by the reading in S107 (S305). After the image processing is completed (S306), the reading and writing unit 150 stores the generated processed image data in the storing unit 160 (S307), and the process ends. As the process ends, the processed image data (processed image data) is generated and stored.

Thus, the processed image data in which the characteristics of the image defect are more recognizable than the read image data is generated and stored. Accordingly, based on the processed image data, the failure that has caused the image defect can be properly determined. The processed image data thus stored in the image forming apparatus 100 can be used by a visiting customer engineer. The processed image data can be regularly stored to be used for management of the image forming apparatus 100.

Embodiment 4 is described below. The features illustrated in FIGS. 1 to 7 and FIG. 9 are common to Embodiments 1 and 4, and redundant descriptions are omitted.

Figure 12:
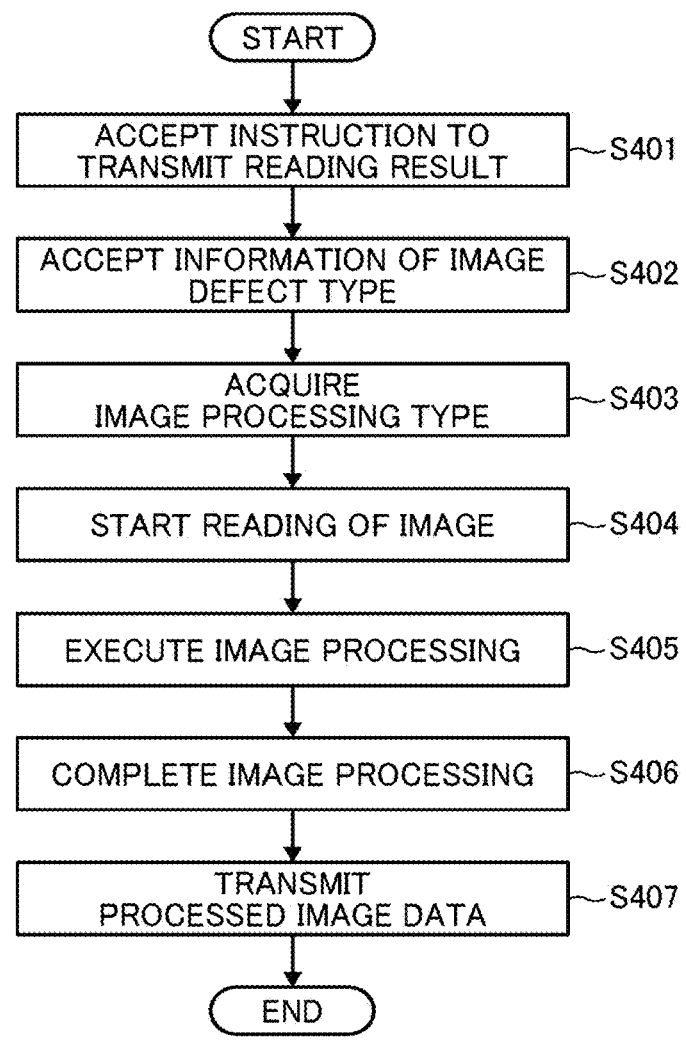
FIG. 12 is a flowchart illustrating an example of a flow of process to transmit a result of reading according to Embodiment 4.

FIG. 12 is a flowchart illustrating an example of reading result transmission process according to Embodiment 4. The flow illustrated in FIG. 12 starts in response to an input of an instruction to transmit the result of reading of the test chart from the input acceptance unit 110 after completion of image reading as illustrated in FIG. 9.

First, the input acceptance unit 110 accepts an instruction to transmit the result of reading (S401). The image processing control unit 134 refers to the image-processing association table illustrated in FIG. 6 and acquires the image defect type, based on the accepted information of image defect type (402).

The image processing control unit 134 refers to the image-processing association table illustrated in FIG. 6 and acquires the image processing type, using the image defect type as a key, based on the accepted information of image defect type (S403). Then, the image reading control unit 133 starts image reading (S404). According to the image processing type acquired in S106, the image processing control unit 134 performs the image processing of the read image data generated by the reading in S107 (S405). After the image processing is completed (S406), the communication control unit 140 transmits the generated processed image data to an external device (S407), and the process ends. As the process ends, the processed image data (processed image data) is generated and transmitted.

Thus, the processed image data in which the characteristics of the image defect are more recognizable than the read image data is generated and transmitted. Accordingly, based on the processed image data, the failure that has caused the image defect can be properly determined. Further, flexibility of the information processing system increases.

Embodiment 5 is described below. The features illustrated in FIGS. 1 to 7 and FIG. 9 are common to Embodiments 1 and 5, and redundant descriptions are omitted.

Figure 13:
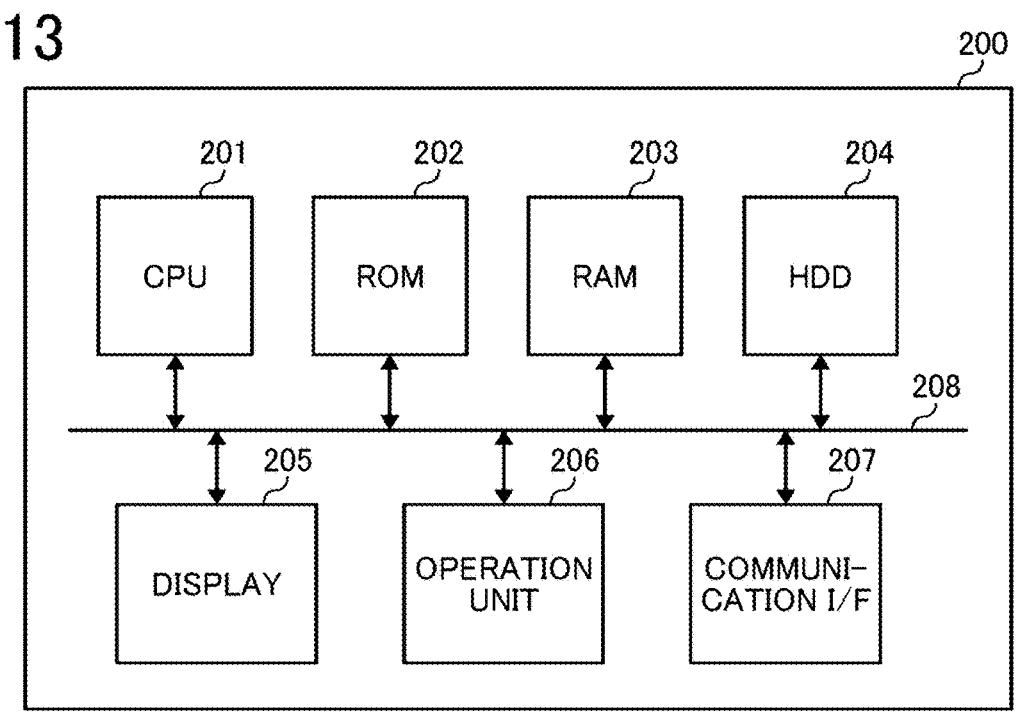
FIG. 13 is a block diagram of a hardware configuration of a server apparatus or a terminal device according to Embodiment 5.

FIG. 13 is a block diagram of a hardware configuration of a server apparatus according to Embodiment 5. The server apparatus 200 includes a CPU 201, a ROM 202, a RAM 203, an HDD 204, a display 205, an operation unit 206 such as a keyboard, a mouse, and a touch panel, and a communication I/F 207. These components are connected via a system bus 208.

The CPU 201 executes the OS stored in the ROM 202 or the HDD 204, and other various application programs, using the RAM 203 as a work area, to control the entire operation of the terminal device 400. The HDD 204 can also store at least a part of a failure diagnosis program to execute failure diagnosis.

The display 205 displays, to the user, various information necessary for the operation by the user.

The operation unit 206 accepts a user's operation. In this disclosure, the expression "accept(s) a user's operation" is a concept including accepting information that is input in response to the user's operation.

The communication I/F 207 is for communicating with another device via the communication network N by Ethernet (registered trademark) or Wi-Fi, for example.

The server apparatus 200 can further include a media I/F or the like for reading and writing various media.

Figure 14:
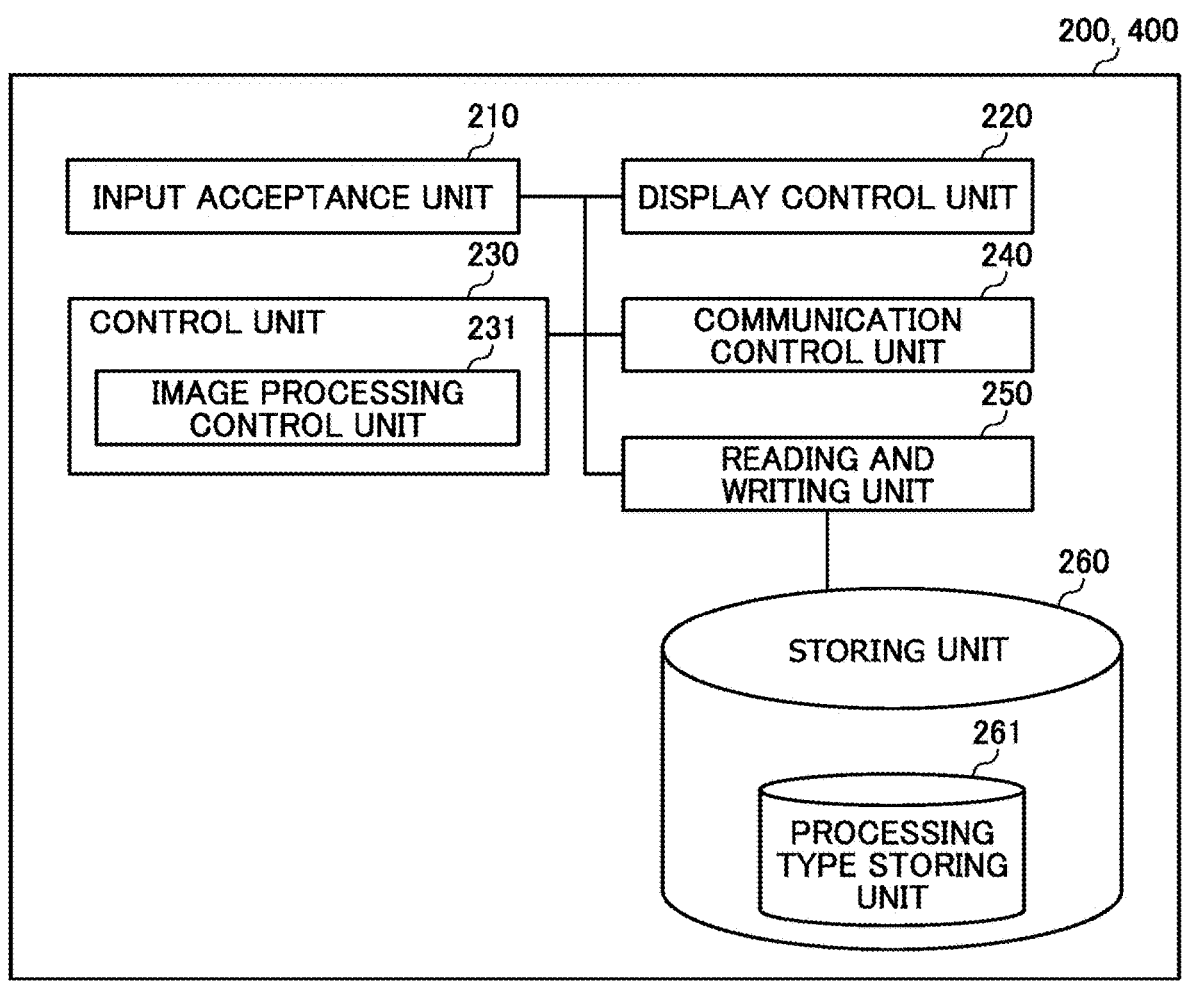
FIG. 14 is a functional block diagram of the server apparatus or the terminal device according to Embodiment 5.

FIG. 14 is a block diagram of a hardware configuration of the server apparatus according to Embodiment 5. The server apparatus 200 includes an input acceptance unit 210, a display control unit 220, a control unit 230, a communication control unit 240, a reading and writing unit 250, and a storing unit 260.

The input acceptance unit 210 is implemented by processing of the operation unit 206 and accept various inputs made by the operator.

The display control unit 220 is implemented by the CPU 201 executing a program stored in the ROM 202 or the HDD 204 using the RAM 203 as a work area and configured to control a display screen displayed on the display 205.

The control unit 230 is implemented by the CPU 201 executing a program stored in the ROM 202 or the HDD 204 using the RAM 203 as a work area and configured to control functions of the overall server apparatus 200.

The control unit 230 includes an image processing control unit 231.

The communication control unit 240 is implemented by the processing of the communication I/F 207 and executes a function of communication using the network N.

The reading and writing unit 250 is implemented by the CPU 201 executing a program stored in the ROM 202 or the HDD 204 using the RAM 203 as a work area. The reading and writing unit 250 stores various types of data in the storing unit 260 and retrieves the data from the storing unit 260.

The storing unit 260 is implemented by processing of the ROM 202 or the HDD 204 and configured to store programs, various setting information necessary for the operation of the server apparatus 200, operation logs of the server apparatus 200, and the like.

Alternatively, the storing unit 260 can be implemented by a temporary storing function of the RAM 203.

The storing unit 260 includes a processing type storing unit 261. The processing type storing unit 261 stores in advance the image-processing association table described with reference to FIG. 6.

In Embodiment 5, the server apparatus 200 accepts, via the network N, the read image data generated as the processing result of the reading process illustrated in FIG. 9 and performs image processing when storing the accepted read image data in the storing unit 260.

More specifically, as illustrated in FIG. 11, in Embodiment 3, the image forming apparatus 100 performs image processing in response to an instruction to store the read image data in the storing unit 160 of the image forming apparatus 100. On the other hand, in Embodiment 6, when the input acceptance unit 210 of the server apparatus 200 accepts the instruction to store the read image data, the image processing control unit 231, the reading and writing unit 250, the storing unit 260, and the processing type storing unit 261 together execute the process flow illustrated in FIG. 11.

In Embodiment 6, the server apparatus 200 accepts, via the network N, the read image data generated as the result of the reading process illustrated in FIG. 9 and performs image processing when transmitting the accepted read image data to an external device, for example, the terminal device 400.

More specifically, as illustrated in FIG. 12, in Embodiment 4, the image forming apparatus 100 performs image processing in response to an instruction to transmit the read image data from the image forming apparatus 100 to an external device. On the other hand, in Embodiment 7, when the input acceptance unit 210 of the server apparatus 200 accepts the instruction to transmit the read image data, the image processing control unit 231, the reading and writing unit 250, the storing unit 260, the processing type storing unit 261, and the communication control unit 240 together execute the process flow illustrated in FIG. 12.

In Embodiment 7, the terminal device 400 performs image processing when displaying, via the network N, the read image data generated as a result of the reading process illustrated in FIG. 9.

More specifically, in Embodiment 2 illustrated in FIG. 10, the image forming apparatus 100 executes image processing in response to an instruction for displaying the read image data on the display (e.g., the control panel 17) of the image forming apparatus 100. On the other hand, in Embodiment 7, the terminal device 400 performs image processing when accepting an instruction for displaying on the display 205 of the terminal device 400. An example is a case where a customer engineer who uses the terminal device 400 acquires (e.g., downloading to the terminal device 400) the read image data and then inputs, using the operation unit 206, an instruction for displaying on the display 205. In another example, a customer engineer who uses the terminal device 400 acquires an address on the network N for accessing the read image data and then accesses the read image data, thereby inputting the instruction for displaying on the display 205. However, examples are not limited thereto.

Figure 15:
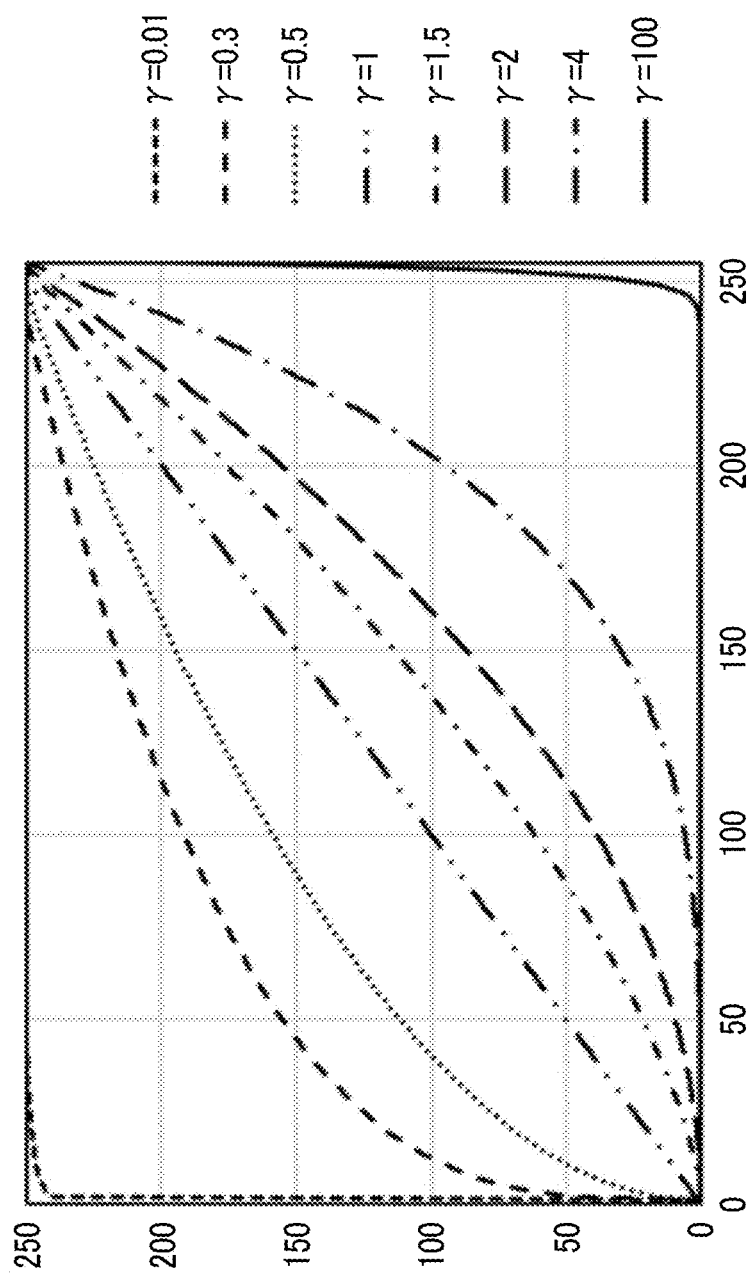
FIG. 15 is a graph that illustrates an example of image processing.

FIG. 15 is a graph that illustrates an example of image processing. Description are given below of gamma (γ) correction as an example of the image processing with reference to FIG. 15. On the horizontal axis of the graph illustrated in FIG. 15, as input values, gradation values of 0 to 255 obtained from the read image data are indicated. The vertical axis represents the output values converted by the gamma correction. As illustrated in FIG. 15, the difference in density between the darker part and the middle density part is emphasized when the gamma value is smaller. By contrast, the difference in density between a whiter part and the middle density part is emphasized when the gamma value is greater. Appropriately setting the gamma value in accordance with the image attains image processing that corrects the density gradation of the image or obtains a desired contrast.

Figure 16:
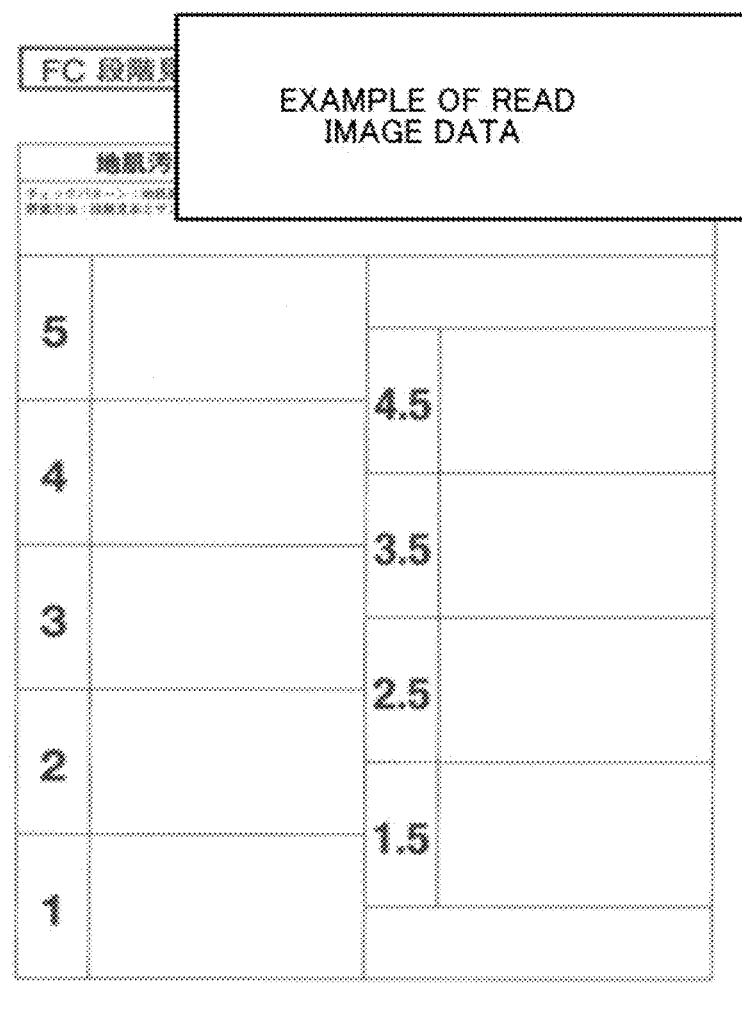
FIG. 16 is an example of a read image having an image defect.

FIG. 16 is an example of the read image having the image defect. The read image illustrated in FIG. 16 includes background fog (background stains) as an example of the image defect. The determination on the characteristics of such background stains, for example, the location of the background stains, may vary depending on the proficiency level of the user evaluating the background stains, the environment in which the user evaluates the image defect, or the like.

Figure 17:
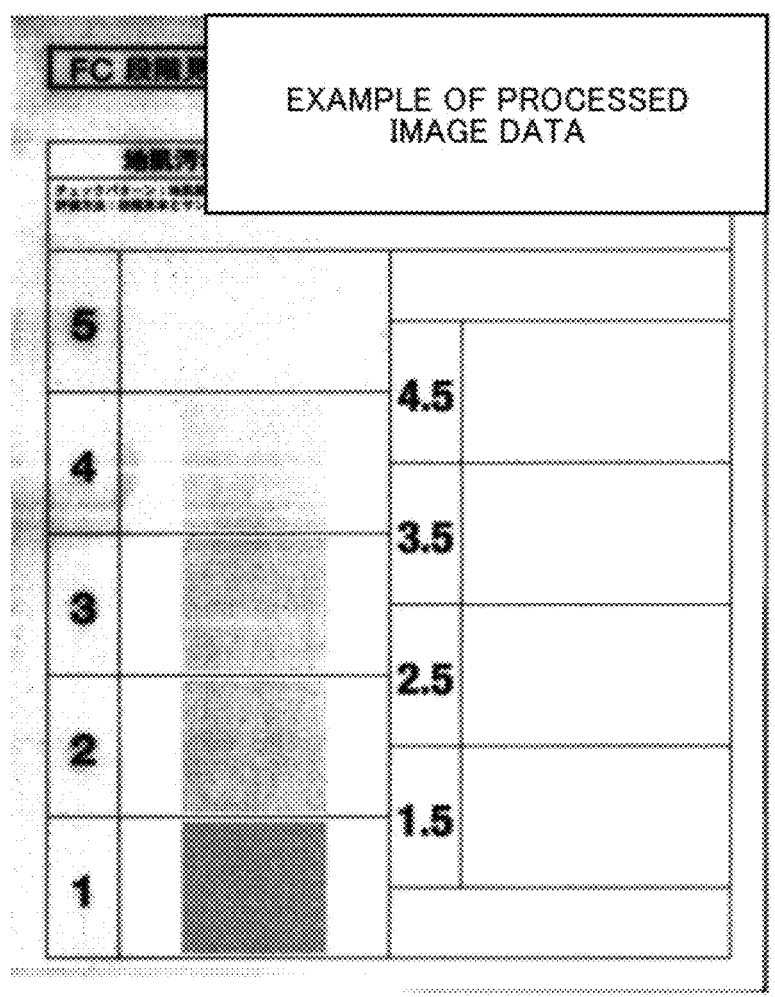
FIG. 17 illustrates an example of a processed image.

FIG. 17 illustrates an example of the processed image. In this example, the gamma correction of γ=100 illustrated in FIG. 15 is performed in the read image data having the image defect illustrated in FIG. 16. In the processed image illustrated in FIG. 17, the background fouling of the read image illustrated in FIG. 16 are emphasized. Thus, in the processed image, the characteristics of the image defect are easily determined. The gamma value is not limited to 100 and can be set as appropriate.

Note that, in the information processing system S1, each of the image processing control unit 134 and the image processing control unit 231 can be included in any one or all of the image forming apparatus 100, the server apparatus 200, and the terminal device 400.

Next, descriptions are given below of screen transition on the display (e.g., the control panel 17) of the image forming apparatus 100, with reference to FIGS. 18 to 30.

Figure 18:
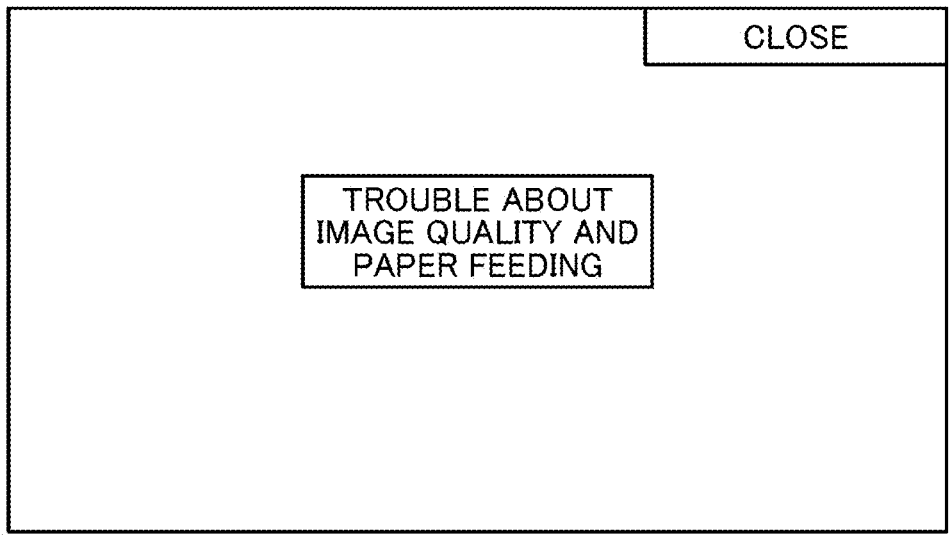
FIG. 18 is a diagram illustrating an example of screen transition on a display of the image forming apparatus.

FIG. 18 is a diagram illustrating an example of screen transition on the display (the control panel 17) of the image forming apparatus 100. The screen illustrated in FIG. 18 is displayed when a predetermined button, such as a help button or a support button, is pressed on the home screen displayed on the control panel 17 of the image forming apparatus 100. Hereinafter, screen illustrated in FIG. 18 may be called a support top screen.

Figure 19:
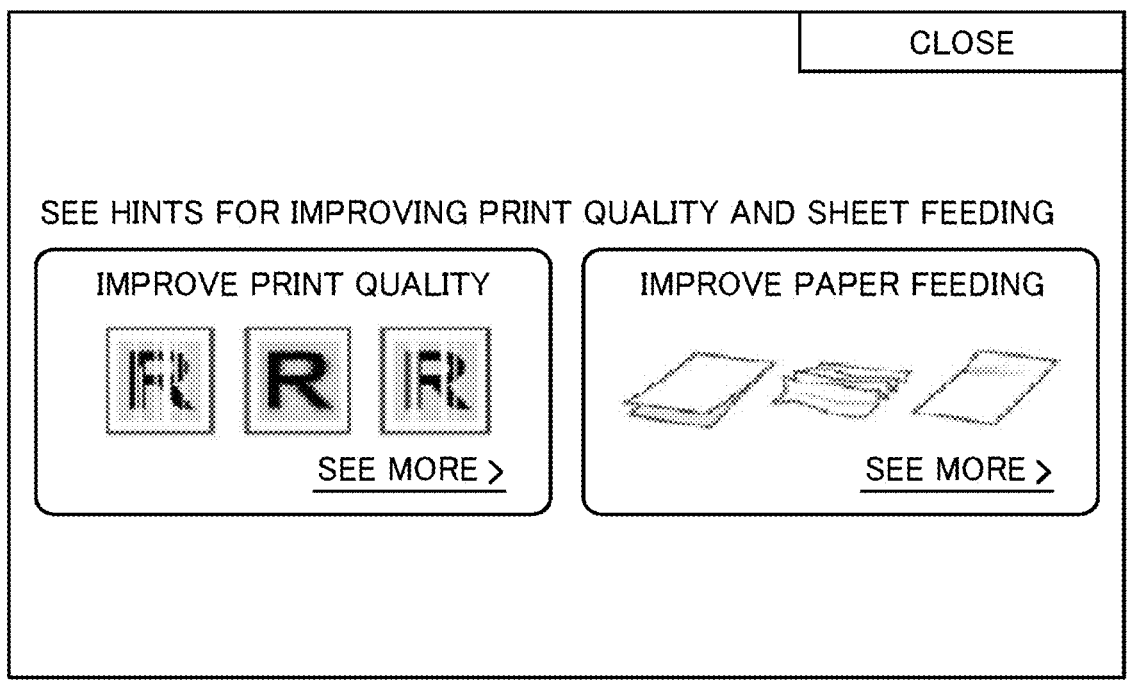
FIG. 19 is a diagram illustrating a second example of the screen on the display of the image forming apparatus.

On the support top screen, when a button labelled "trouble about image quality and paper feeding" is pressed, the screen changes to a screen illustrated in FIG. 19. In addition, when a button labelled "close" is pressed on the support top screen, the display returns to the home screen of the image forming apparatus 100. Pressing the button labelled "trouble about image quality and paper feeding" on the screen illustrated in FIG. 18, the operator (e.g., the user or the customer engineer) of the image forming apparatus 100 can use the functions of the image forming apparatus 100 prepared for the case where the image quality of the formed image is not satisfactory.

FIG. 19 is a diagram illustrating a second example of the screen on the display of the image forming apparatus 100. The screen illustrated in FIG. 19 is displayed when a button labelled "trouble about image quality and paper feeding" is pressed on the screen illustrated in FIG. 18.

Figure 20:
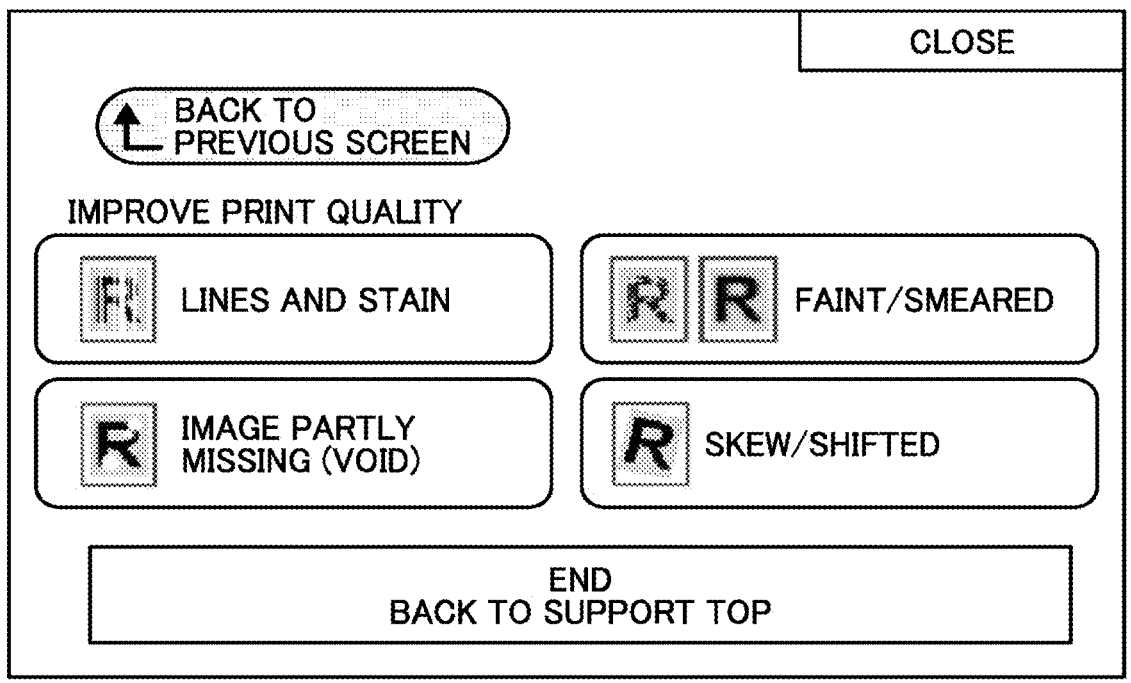
FIG. 20 is a diagram illustrating a third example of the screen on the display of the image forming apparatus.

On the screen illustrated in FIG. 19, when the operator presses the button labelled "improve print quality" is pressed, the display changes to the screen illustrated in FIG. 20 for guiding an action to be taken by the user to improve the print quality. When a button labelled "improve paper feeding" is pressed, the screen changes to a screen for guiding an action to be taken by the user to solve the trouble in paper feeding. In addition, when the button labelled "close" is pressed, the display returns to the home screen of the image forming apparatus 100.

Pressing the button labelled "improve print quality" or the button labelled "improve paper feeding" on the screen illustrated in FIG. 19, the operator can use the functions of the image forming apparatus 100 to improve the print quality or solve the trouble in paper feeding.

FIG. 20 is a diagram illustrating a third example of the screen on the display of the image forming apparatus 100. The screen illustrated in FIG. 20 is displayed when the button labelled "improve print quality" is pressed on the screen illustrated in FIG. 19.

The screen illustrated in FIG. 20 presents four buttons respectively labelled "lines and stain", "faint/smeared", "image party mission (void)", and "skew/shifted" corresponding to the image defect types. As the operator presses the button labelled with the image defect to be resolved, selected from the four buttons, the display screen advances to a corresponding screen. When the button labelled "close" is pressed, the display returns to the previous screen. When the button labelled "exit" is pressed, the display returns to the support top screen.

Selecting the image defect type on the screen illustrated in FIG. 20, the operator can receive the support provided by the image forming apparatus 100 corresponding to the image defect type.

As an example, as the operator operates the control panel 17 to input the image defect type information using the button selected from the four buttons presented in FIG. 20, the input acceptance unit 110 of the image forming apparatus 100 accepts the image defect type. Then, the flow illustrated in FIG. 7 can be started.

Note that, while the test-chart association table illustrated in FIG. 5 includes six image defect types and the image-processing association table illustrated in FIG. 6 includes even image defect types, the screen illustrated in FIG. 19 presents the buttons for only the four image defect types. All types of image defects associated in the respective tables, that is, the six types for the test-chart association table illustrated in FIG. 5 and seven types for the image-processing association table illustrated in FIG. 6 may be presented as options selectable by the operator. However, for ordinary people, identifying a detailed image defect type is often difficult. Therefore, the selection screen such as the screen illustrated in FIG. 19 is transitioned a plurality of times for the operator to input image defect information. Then, based on the image defect information, a specific image defect associated in the respective tables in FIGS. 6 and 7 is identified.

Figure 21:
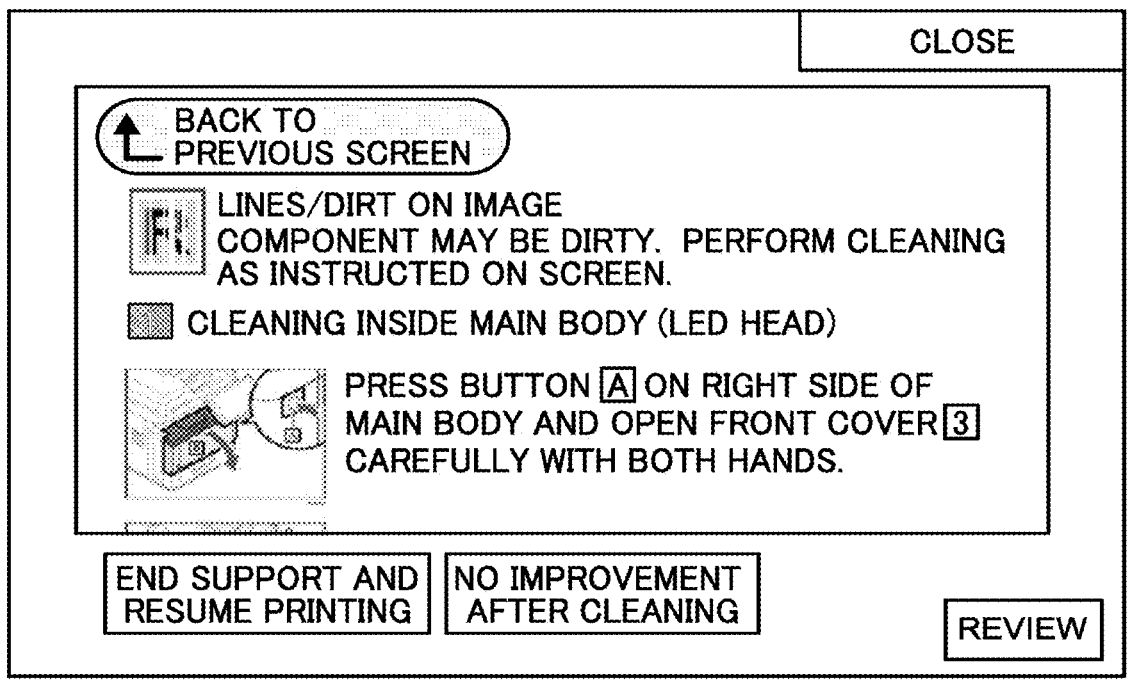
FIG. 21 is a diagram illustrating a fourth example of the screen on the display of the image forming apparatus.

FIG. 21 is a diagram illustrating a fourth example of the screen on the display of the image forming apparatus 100. The screen illustrated in FIG. 21 is displayed when the button labelled "lines and stain" is pressed on the screen illustrated in FIG. 20. As illustrated in FIG. 21, the screen presents actions to be taken by the operator to solve or alleviate the selected image defect. In FIG. 21, the cleaning inside the main body is suggested on the display.

The operator executes the action according to the instructions on the screen and then presses the button labelled "review". Then, an image for review is printed. When the image defect is alleviated on the printed review image, the operator presses a button labelled "end support and resume printing". If the image defect is not alleviated, the operator presses the button labelled "no improvement after cleaning".

On the screen illustrated in FIG. 21, as the operator presses the button labelled "end support and resume printing", the support screen is closed, and the display changes to a screen, such as the home screen, on which printing can be instructed. On the screen illustrated in FIG. 21, when the operator presses the button labelled "no improvement after cleaning", the display changes to the screen illustrated in FIG. 22. When the "close" button is pressed, the display returns to the home screen.

Pressing the button labelled "no improvement after cleaning" on the screen illustrated in FIG. 21, the operator can execute the failure diagnosis provided by the image forming apparatus 100.

Figure 22:
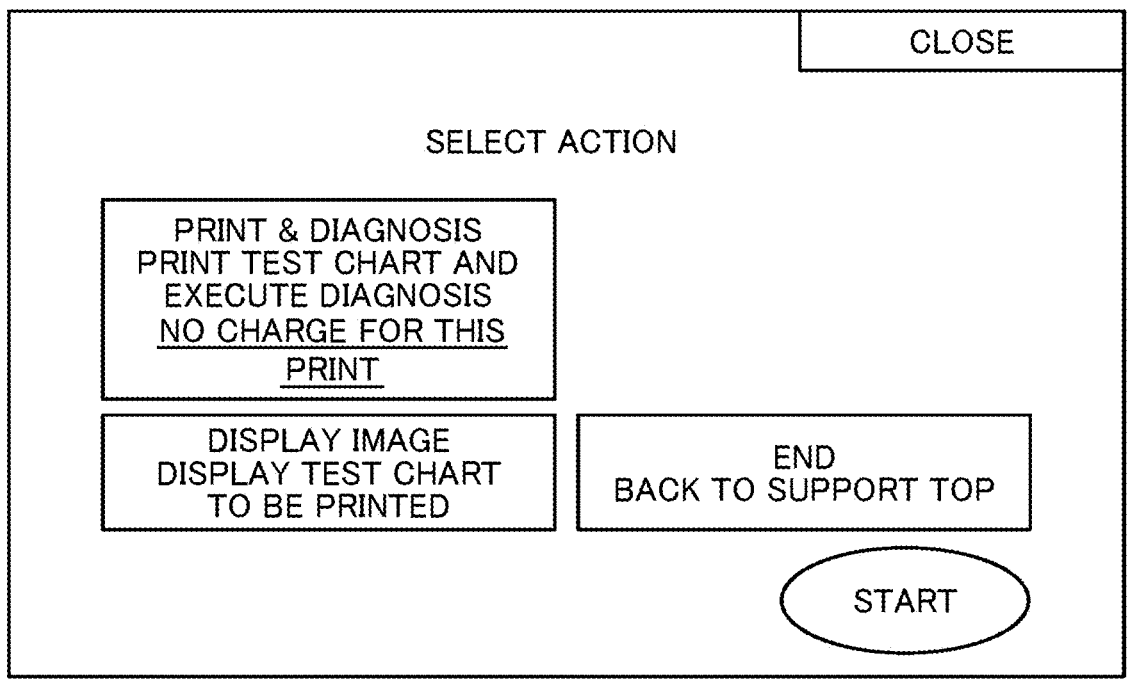
FIG. 22 is a diagram illustrating a fifth example of the screen on the display of the image forming apparatus.

FIG. 22 is a diagram illustrating a fifth example of the screen on the display of the image forming apparatus 100. The screen illustrated in FIG. 22 is displayed when the button labelled "no improvement after cleaning" is pressed on the screen illustrated in FIG. 21.

On the screen illustrated in FIG. 22, when the operator presses the start button in the state where a button labelled "print & diagnosis" is selected (pressed), printing of the test chart (S103 in FIG. 7) is executed for failure diagnosis. When a button labelled "display image" is pressed, the test chart to be printed is displayed on the control panel 17. When a button labelled "end" is pressed, the display returns to the support top screen.

Selecting the "print & diagnosis" button in FIG. 22 and pressing the start button, the user can print the test chart for diagnosing an image defect to be alleviated.

Figure 23:
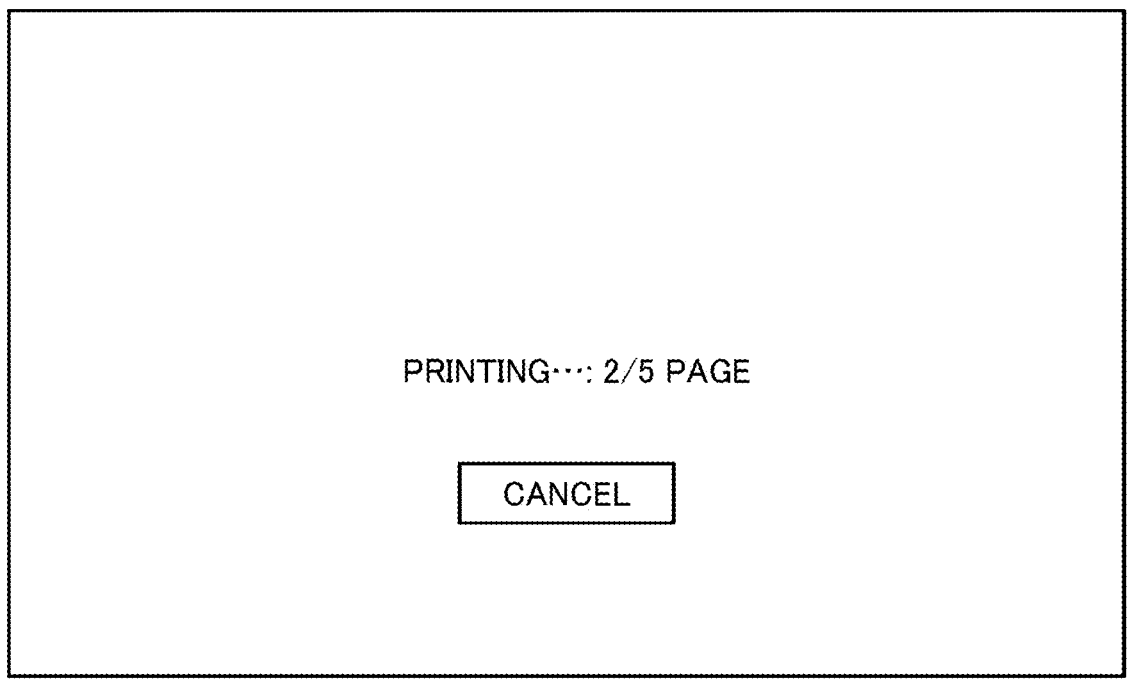
FIG. 23 is a diagram illustrating a sixth example of the screen on the display of the image forming apparatus.

FIG. 23 is a diagram illustrating a sixth example of the screen on the display of the image forming apparatus 100. This screen is displayed when the "print & diagnosis" button is selected, and the start button is pressed. FIG. 23 is a screen for notifying the operator of the progress of printing. When the operator presses the "cancel" button, printing can be canceled.

Figure 24:
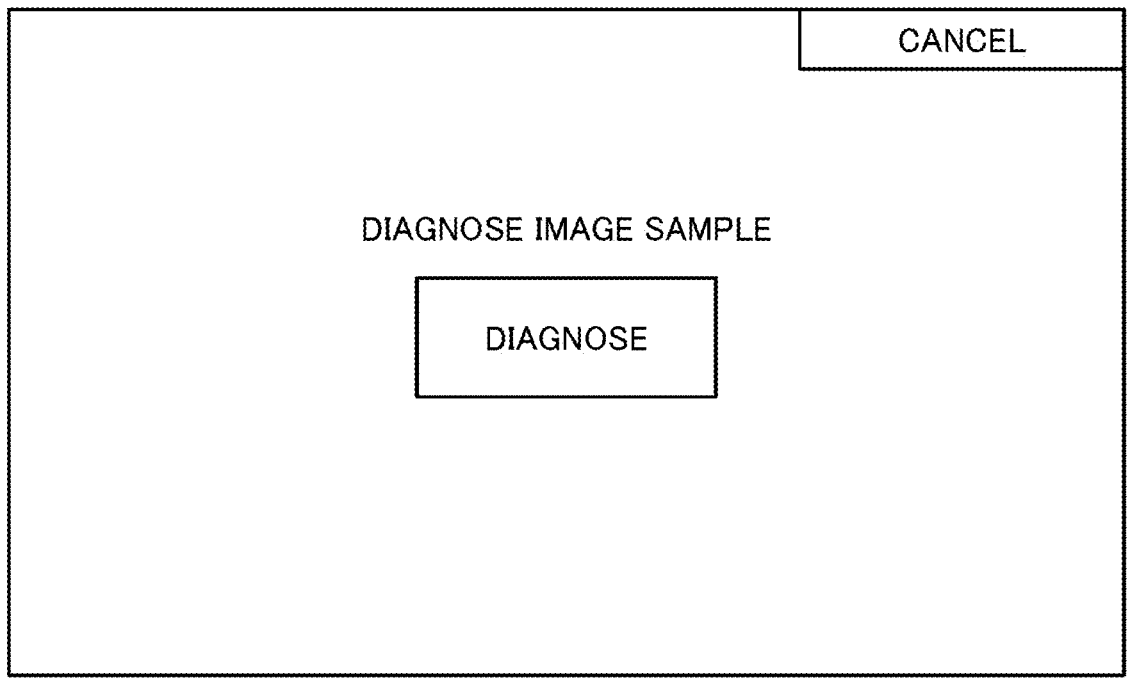
FIG. 24 is a diagram illustrating a seventh example of the screen on the display of the image forming apparatus.

FIG. 24 is a diagram illustrating a seventh example of the screen on the display of the image forming apparatus 100. This screen is displayed as the image forming apparatus 100 completes the printing of the test chart.

When the operator presses the button labelled "diagnosis", subsequently, failure diagnosis is performed. Alternatively, pressing the button labelled "cancel", the operator can end the action without advancing to the image diagnosis. Hereinafter, the button labelled "cancel" has the same function unless otherwise noted.

Figure 25:
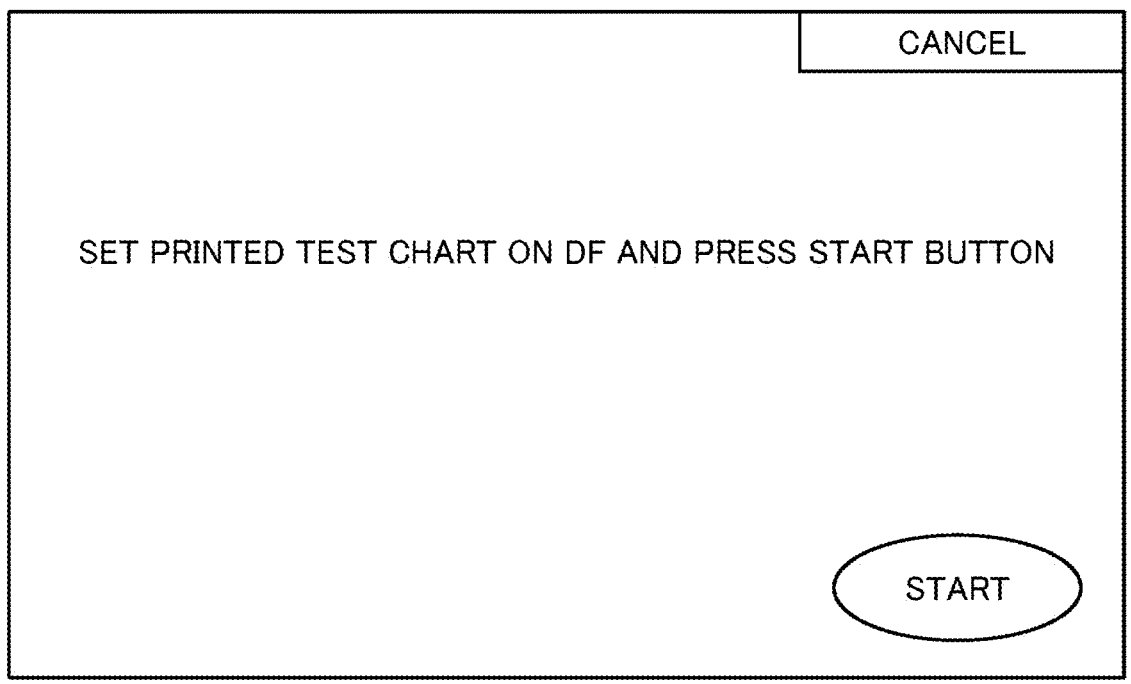
FIG. 25 is a diagram illustrating an eighth example of the screen on the display of the image forming apparatus.

FIG. 25 is a diagram illustrating an eighth example of the screen on the display of the image forming apparatus 100. This screen is displayed when the "diagnosis" button is pressed on the screen illustrated in FIG. 24.

The screen illustrated in FIG. 25 is for prompting the operator to set the printed test chart on the document feeder (DF) and press the start button.

Viewing this screen, the operator sets the printed test chart on the document feeder 51 and presses the start button. Then, the image reading device 1 reads the test chart, and the image data of the test chart is generated.

The screen illustrated in FIG. 25 enables the operator to more reliably execute the image diagnosis using the test chart for failure diagnosis.

Figure 26:
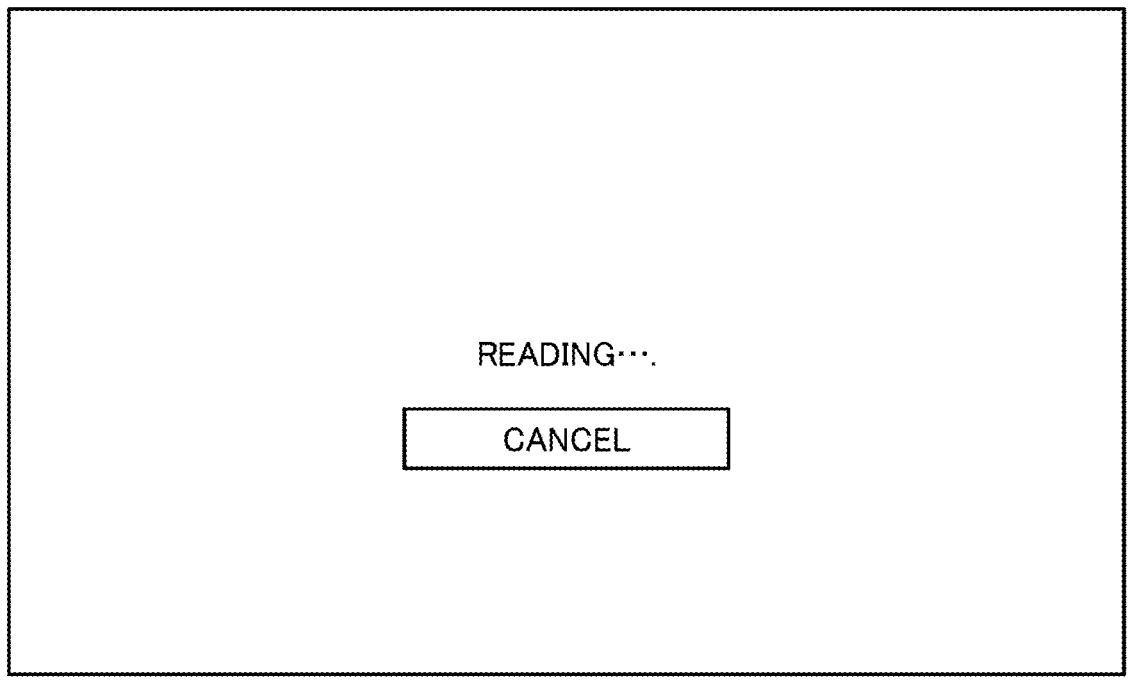
FIG. 26 is a diagram illustrating a ninth example of the screen on the display of the image forming apparatus.

FIG. 26 is a diagram illustrating a ninth example of the screen on the display of the image forming apparatus 100. This screen is displayed when the "start" button is pressed on the screen illustrated in FIG. 25. This screen indicates, for the operator, that reading of the test chart is being performed. When the operator presses the cancel button, the reading can be canceled.

In Embodiment 1, image processing is performed at the time of reading, for example, at the time of reading performed while the screen illustrated in FIG. 26 is displayed.

Figure 27:
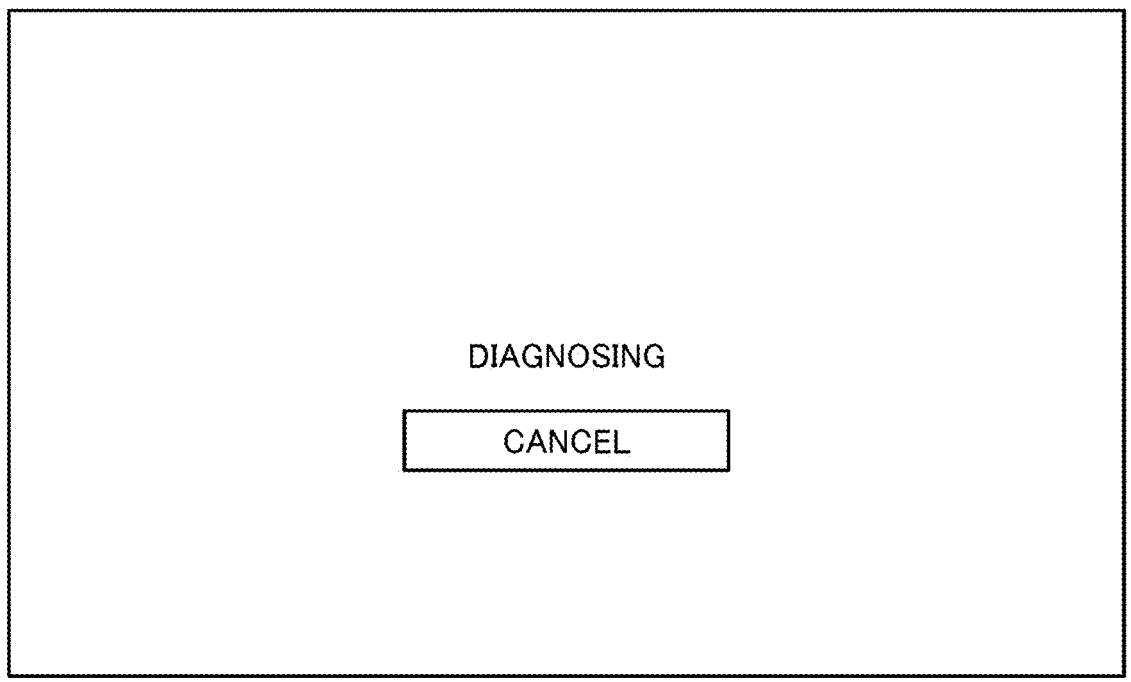
FIG. 27 is a diagram illustrating a tenth example of the screen on the display of the image forming apparatus.

FIG. 27 is a diagram illustrating a tenth example of the screen on the display of the image forming apparatus 100. When reading of the test chart is completed, the screen illustrated in FIG. 27 is displayed following the screen illustrated in FIG. 26. This screen is to notify the operator that failure diagnosis based on the test chart is ongoing. The diagnosis may be canceled in mid course when the cancel button is pressed by the operator.

Figure 28:
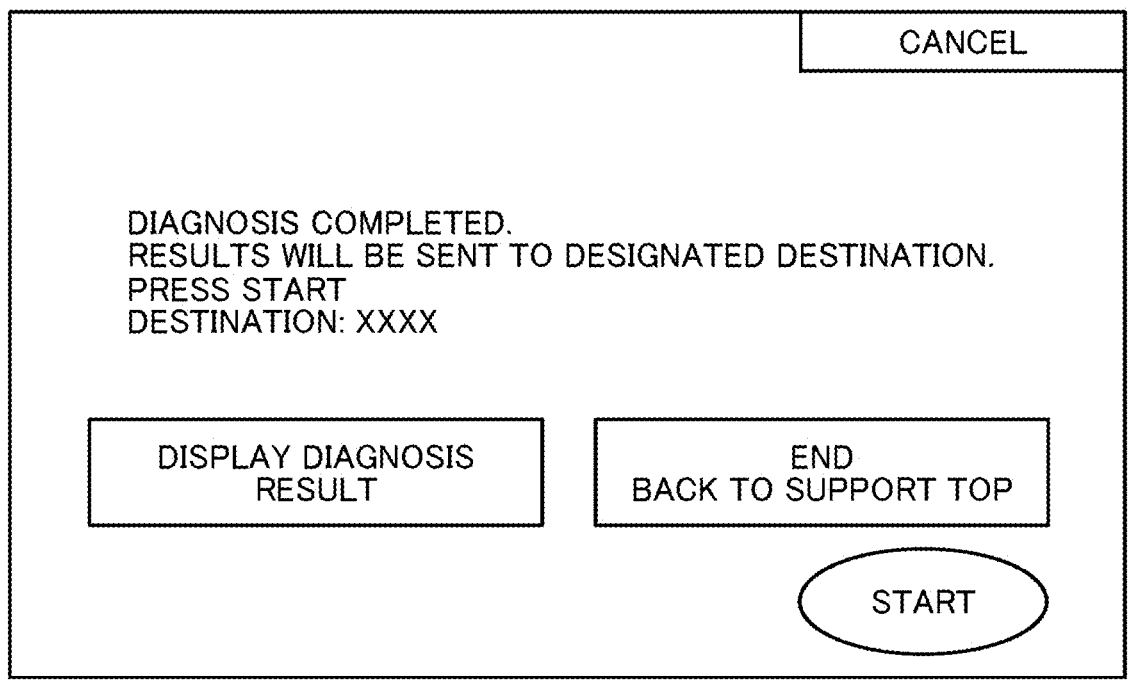
FIG. 28 is a diagram illustrating an eleventh example of the screen on the display of the image forming apparatus.

FIG. 28 is a diagram illustrating an eleventh example of the screen on the display of the image forming apparatus 100. The screen illustrated in FIG. 28 is displayed following the screen illustrated in FIG. 27 after failure diagnosis is completed.

When the start button is pressed on the screen illustrated in FIG. 28, the failure diagnosis result is transmitted to a destination registered in advance, for example, the server apparatus 200 or the call center 300. The diagnosis result can be displayed on the screen by pressing the button labelled "display diagnosis result". The screen can further include a print button to print the diagnosis result. When the end button is pressed, the screen returns to the support top screen.

In other words, the input acceptance unit 110 accepts the instruction for outputting the result, and the output of the result is executed. The screen illustrated in FIG. 28 can be displayed on the display 205 of the server apparatus 200 prior to S210 in Embodiment 2, and the operator of the server apparatus 200 can select the manner of outputting through the operation unit 206.

On the screen illustrated in FIG. 28, the operator can output the failure diagnosis result in a desired manner of outputting.

Figure 29:
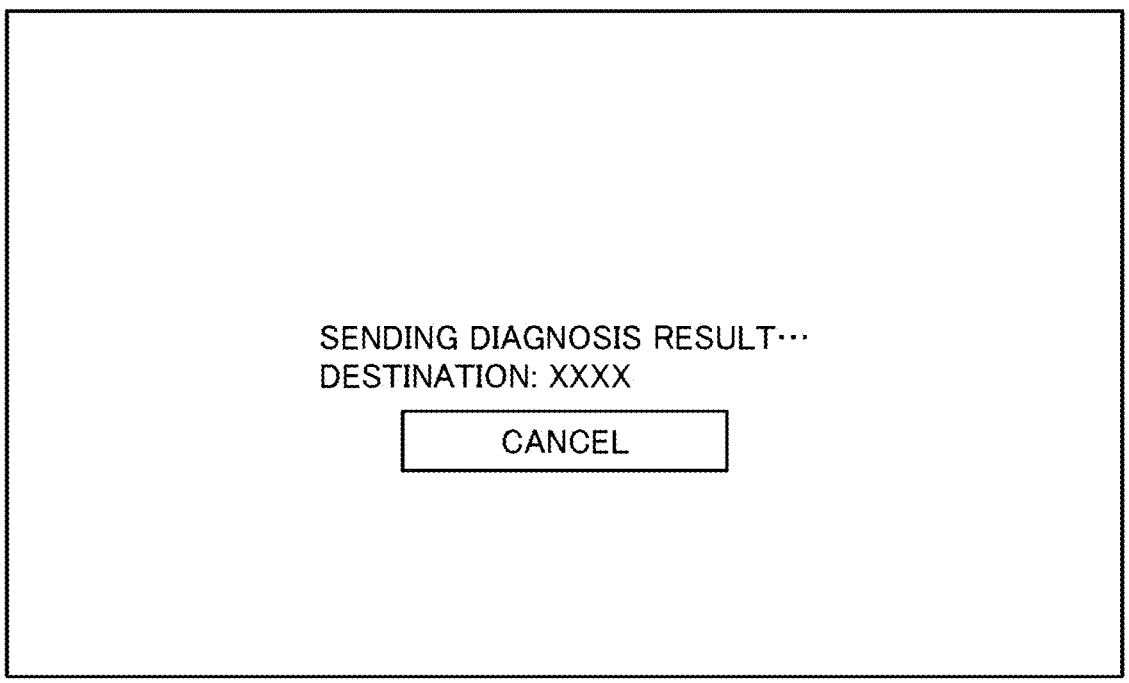
FIG. 29 is a diagram illustrating a twelfth example of the screen on the display of the image forming apparatus.

FIG. 29 is a diagram illustrating a twelfth example of the screen on the display of the image forming apparatus 100. This screen is displayed when the "start" button is pressed on the screen illustrated in FIG. 28. This screen is to notify the operator that transmission is ongoing as an output of a diagnosis result. The transmission can be canceled in mid course when the operator presses the cancel button.

In Embodiment 4, image processing is executed at the time of transmission, for example, at the time of transmission of diagnosis result. That is, image processing is executed while the screen illustrated in FIG. 29 is displayed, and both the processed image data and the diagnosis result can be transmitted.

Figure 30:
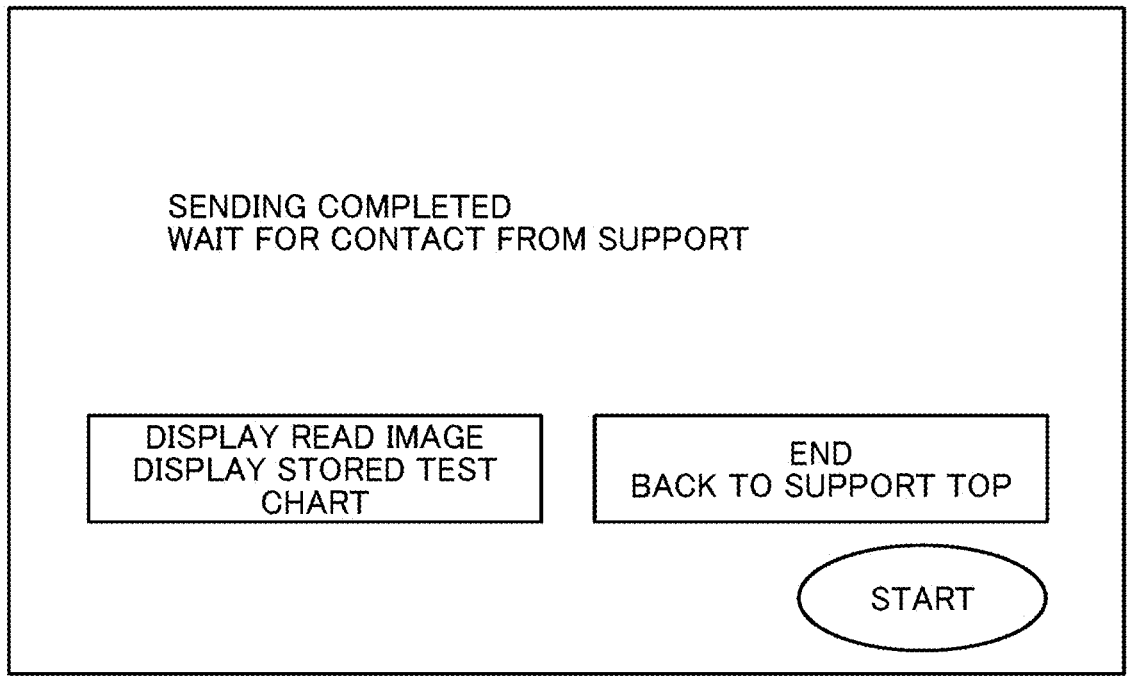
FIG. 30 is a diagram illustrating a thirteenth example of the screen on the display of the image forming apparatus.

FIG. 30 is a diagram illustrating a thirteenth example of the screen on the display of the image forming apparatus 100. When transmission of the diagnosis result is completed, the screen illustrated in FIG. 30 is displayed following the screen illustrated in FIG. 29.

When the start button is pressed in the state where the button labelled "display read image" in the screen illustrated in FIG. 30 is pressed and thus selected, the image data generated from the reading of the test chart is displayed on the control panel 17. In Embodiment 2, image processing is performed at the time of display. For example, when the button labelled "display read image" is pressed in the screen illustrated in FIG. 30, image processing is performed. At this time, both the read image data and the processed image data can be displayed.

When the end button on the screen illustrated in FIG. 30 is pressed, the screen returns to the support top screen. The screen illustrated in FIG. 30 can be provided with a button for deleting the test chart read data so that the read image data is deleted by pressing the button before the process ends.

Similar to the screen illustrated in FIG. 28, the screens illustrated in FIGS. 29 and 30 can be displayed on the display 205 of the server apparatus 200, and the operator of the server apparatus 200 can operate the button through the operation unit 206.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image data generation apparatus, comprising:
circuitry configured to
determine a particular image defect type present in a printed image;
store image processing association information in which a plurality of image defect types is stored in association with a plurality of different image processing operations, respectively;
store image defect association information in which the plurality of image defect types is stored in association with a plurality of different image patterns, respectively;
cause an image forming device to form a particular image pattern selected from the plurality of different image patterns in the stored image defect association information in accordance with the particular image defect type;
select particular image processing from the plurality of different image processing operations in the image processing association information, in accordance with the determined particular image defect type present in the printed image; and
generate processed image data by applying the particular image processing to image data corresponding to the particular image pattern, wherein in the processed image data, an image defect of the particular image defect type is more recognizable than in the image data corresponding to the particular image pattern.

2. The image data generation apparatus according to claim 1, wherein the plurality of different image processing operations in the stored image processing association information includes processes different in image processing content.

3. The image data generation apparatus according to claim 1, wherein the plurality of different image processing operations in the stored image processing association information includes processes different in image processing direction.

4. The image data generation apparatus according to claim 1, wherein the plurality of different image processing operations in the stored image processing association information includes processes different in targeted image type.

5. The image data generation apparatus according to claim 1, wherein the plurality of different image processing operations in the stored image processing association information includes edge enhancement.

6. The image data generation apparatus according to claim 5,
wherein the particular image defect type present in the printed image corresponding to the image data includes a line stain; and
wherein the circuitry is further configured to perform the edge enhancement according to a direction of the line stain.

7. The image data generation apparatus according to claim 1, wherein the plurality of different image processing operations in the stored image processing association information includes density difference enhancement.

8. The image data generation apparatus according to claim 1, further comprising the image forming device configured to form the particular image pattern.

9. The image data generation apparatus according to claim 8, further comprising an image reading device configured to read the particular image pattern formed by the image forming device, to generate the image data.

10. The image data generation apparatus according to claim 9,
wherein the circuitry is further configured to apply the particular image processing on the image data during image reading by the image reading device.

11. The image data generation apparatus according to claim 1, further comprising:
a communication interface configured to communicate with an image forming apparatus configured to form an image; and
an image reading device configured to read the image formed by the image forming apparatus, to generate the image data.

12. The image data generation apparatus according to claim 1,
wherein the circuitry is further configured to output the processed image data to a display configured to display the image data.

13. The image data generation apparatus according to claim 12, wherein the circuitry is further configured to:
accept an input to the image data generation apparatus;
execute the particular image processing in response to an acceptance of an instruction to display the processed image data on the display; and
output the processed image data to the display.

14. The image data generation apparatus according to claim 12, further comprising a communication interface configured to transmit data to an external device,
wherein the circuitry is further configured to:
accept an input to the image data generation apparatus;
execute the particular image processing in response to an acceptance of an instruction to transmit the processed image data; and
transmit the processed image data via the communication interface to the external device.

15. The image data generation apparatus according to claim 1, further comprising a memory to store data,
wherein the circuitry is further configured to
accept an input to the image data generation apparatus;
execute the particular image processing in response to an acceptance of an instruction to store the processed image data in the memory; and
store the processed image data in the memory.

16. An information processing system comprising:
the image data generation apparatus according to claim 1;
a server configured to communicate with the image data generation apparatus; and
a terminal device configured to communicate with the image data generation apparatus, the terminal device including a display configured to display the processed image data transmitted from the image data generation apparatus.

17. An image data generation method, comprising:
determining a particular image defect type present in a printed image;
storing image processing association information in which a plurality of image defect types is stored in association with a plurality of different image processing operations, respectively;
storing image defect association information in which the plurality of image defect types is stored in association with a plurality of different image patterns, respectively;
causing an image forming device to form a particular image pattern selected from the plurality of different image patterns in the stored image defect association information in accordance with the particular image defect type;
selecting particular image processing from the plurality of different image processing operations in the image processing association information, in accordance with the determined particular image defect type present in the printed image; and
performing the particular image processing on image data corresponding to the particular image pattern to generate processed image data in which an image defect of the particular image defect type is more recognizable than in the image data corresponding to the particular image pattern.

18. A non-transitory computer-readable recording medium storing a program for causing a computer to execute a method, the method comprising:
determining a particular image defect type present in a printed image;
storing image processing association information in which a plurality of image defect types is stored in association with a plurality of different image processing operations, respectively;
storing image defect association information in which the plurality of image defect types is stored in association with a plurality of different image patterns, respectively;
causing an image forming device to form a particular image pattern selected from the plurality of different image patterns in the stored image defect association information in accordance with the particular image defect type;
selecting particular image processing from the plurality of different image processing operations in the image processing association information, in accordance with the determined particular image defect type present in the printed image; and
performing the particular image processing on image data corresponding to the particular image pattern to generate processed image data in which an image defect of the particular image defect type is more recognizable than in the image data corresponding to the particular image pattern.

* * * * *